(12) United States Patent
Jeoung et al.

(10) Patent No.: US 7,666,695 B2
(45) Date of Patent: Feb. 23, 2010

(54) ARRAY SUBSTRATES OF LIQUID CRYSTAL DISPLAY AND FABRICATION METHOD THEREOF

(75) Inventors: Hun Jeoung, Gyeongsangbuk-do (KR); Jeong Woo Jang, Daegu-si (KR)

(73) Assignee: LG. Display Co., Ltd., Seoul (KR)

(*) Notice: Subject to any disclaimer, the term of this patent is extended or adjusted under 35 U.S.C. 154(b) by 132 days.

(21) Appl. No.: 12/056,749

(22) Filed: Mar. 27, 2008

(65) Prior Publication Data
US 2008/0176348 A1    Jul. 24, 2008

Related U.S. Application Data

(62) Division of application No. 10/946,128, filed on Sep. 21, 2004, now Pat. No. 7,368,755.

(30) Foreign Application Priority Data
Apr. 12, 2004  (KR)  .............................. P2004-24856

(51) Int. Cl.
*H01L 21/00* (2006.01)
(52) U.S. Cl. .................. 438/34; 438/30; 438/149; 438/164; 257/E33.001
(58) Field of Classification Search ............ 438/30
See application file for complete search history.

(56) References Cited

U.S. PATENT DOCUMENTS

| | | | |
|---|---|---|---|
| 6,310,372 B1 * | 10/2001 | Katayama et al. | 257/291 |
| 6,532,045 B2 * | 3/2003 | Chung et al. | 349/43 |
| 6,545,730 B1 * | 4/2003 | Hwang | 349/43 |
| 6,621,102 B2 * | 9/2003 | Hirakata et al. | 257/72 |
| 6,825,820 B2 * | 11/2004 | Yamazaki et al. | 345/76 |
| 2003/0086046 A1 * | 5/2003 | You | 349/149 |
| 2003/0116766 A1 * | 6/2003 | Zhang | 257/72 |
| 2003/0127651 A1 * | 7/2003 | Murakami et al. | 257/72 |

FOREIGN PATENT DOCUMENTS

| | | | |
|---|---|---|---|
| JP | 10-22506 | * | 1/1989 |
| JP | 9-222597 A | * | 8/1997 |
| JP | 2003-229578 A | * | 8/2003 |
| KR | 2002-36023 | * | 5/2002 |
| KR | 2003-94528 | * | 10/2003 |

* cited by examiner

*Primary Examiner*—David A Zarneke
(74) *Attorney, Agent, or Firm*—Brinks Hofer Gilson & Lione

(57) ABSTRACT

Provided is an array substrate of an LCD that includes a substrate, an active layer, a first insulating layer, and a gate electrode sequentially formed on the substrate. A source region and a drain region reside in predetermined regions of the active layer and each is doped with impurity ions. A second insulating layer overlies an entire surface of the substrate including the gate electrode. A pixel electrode resides on the second insulating layer. First and second contact holes reside in the first and second insulating layer and expose portions of the source region and the drain region, respectively. A portion of a source electrode contacts the source region through the first contact hole and a first portion of a drain electrode contacts the drain region and a second portion contacts the pixel electrode.

16 Claims, 22 Drawing Sheets

ARRAY SUBSTRATES OF LIQUID CRYSTAL DISPLAY AND FABRICATION METHOD THEREOF

RELATED APPLICATIONS

This divisional application claims the benefit of U.S. patent application Ser. No. 10/946,128 filed on Sep. 21, 2004 now U.S. Pat. No. 7,368,755 which claims, priority to Korean Application No. 24856/2004, filed in Korea on Apr. 12, 2004, the disclosure of both which is incorporated by reference herein in their entirety.

BACKGROUND

1. Technical Field

The present invention relates to an array substrate of a liquid crystal display device (LCD), and more particularly, to an array substrate having a polysilicon thin film transistor (TFT)-LCD which is fabricated using a diffraction exposure process, and a fabrication method thereof.

2. Description of the Related Art

Until recently, a cathode ray tube (CRT) has been most widely used among display devices for displaying image information on a screen. The CRT, however, has may inconveniences owing to a large volume and weight compared with the display area. To this end, a thin flat panel display has been developed that can be used anywhere, because it has a large display area and has a very thin profile. The flat panel display is now replacing the CRT. In particular, a liquid crystal display (LCD) exhibits higher resolution than other flat panel displays, and has a rapid response speed that is comparable to the display quality of the CRT when displaying moving images.

In operation, the LCD utilizes optical anisotropy and polarization. In other words, an alignment direction of the liquid crystal molecules is controllable by artificially applying an electromagnetic field to the liquid crystal molecules, which are thin and long in their structure and are directionally aligned.

The ability to artificially control their alignment direction allows the alignment direction of the liquid crystal molecules to be changed and the light that is polarized due to the optical anisotropy to can be modulated. Accordingly, the LCD is capable of displaying image information through the application of an electromagnetic field.

An active matrix liquid crystal display includes thin film transistors (TFTs) and pixel electrodes connected with the TFTs that are arranged in a matrix configuration. The active matrix LCD is being widely used due to its high resolution and superior moving picture reproduction capability.

A base element of the LCD is the liquid crystal panel, which will now be described with reference to the accompanying drawing.

FIG. 1 is a partial exploded perspective view of a typical LCD. In general, an LCD 11 includes an upper substrate 5 and a lower substrate 22. The upper substrate 5 includes a black matrix layer 6, a color filter layer 7, including sub-color filters of red (R), green (G) and blue (B), and a transparent common electrode 18 formed on the color filter layer 7. The lower substrate 22 includes pixel regions (P), pixel electrodes 17 formed on the pixel regions (P) and an array interconnection line including switching elements (T). Between the upper substrate 5 and the lower substrate 22, there is interposed a liquid crystal layer 15, described above.

The lower substrate 22 is known in the art as an "array substrate." On the lower substrate 22, a plurality of thin film transistors that function as switching elements are arranged in a matrix configuration, and gate lines 13 and data lines 15 are formed to cross the plurality of thin film transistors. Also, the pixel regions (P) are defined by the crossing pattern of the gate lines 13 and the data lines 15.

The pixel electrode 17 formed on the pixel region (P) is made of a transparent conductive material having a superior light transmittance such as indium-tin-oxide. (ITO).

The LCD 11 configured as described above, displays images when the liquid crystal molecules of the liquid crystal layer 14 on the pixel electrode 17 are aligned by a signal applied via the thin film transistors. The liquid crystal molecules are aligned in such a way as to control the amount of light passing through the liquid crystal layer 14.

FIG. 2 is a partially magnified plan view of some pixels of a related art LCD array substrate. The array substrate employs a p-Si TFT. In other words, TFTs employed in LCDs are classified into amorphous silicon (a-Si) TFTs and polycrystalline silicon (p-Si) TFTs depending on crystalline state of the semiconductor layer serving as an active channel.

In a p-Si TFT, the driving frequency of a driving circuit that determines the number of the driving pixels can be advantageously enhanced and thus high definition capability is possible because the TFT has high field effect mobility. Also, in the p-Si TFT, enhanced picture quality can be expected because the charge time of a signal voltage to the pixel regions is reduced and thus distortion of transfer signals is reduced. Further, the p-Si TFT has an advantage of low power consumption because it can be driven at a voltage less than 10 V, compared with the a-Si TFT, which has a relatively higher driving voltage (about 25V).

Referring to FIG. 2, a plurality of gate lines 111 and a plurality of orthogonal data lines 112 are arranged in a matrix configuration, thereby defining pixel regions (P).

At cross points of the data lines 112 and the gate line 111, the TFTs (T) each include a semiconductor layer 116, a gate electrode 120, a source electrode 126 and a drain electrode 128, and pixel electrodes 134 electrically connected with the TFTs.

The semiconductor layer 116 is electrically connected with the source electrode 126 and the drain electrode 128 through first and second semiconductor layer contact holes 122a and 122b, and the drain electrode 128 is electrically connected with the pixel electrode 134 through a drain contact hole 130.

The semiconductor layer 116 is formed by depositing an amorphous (a-Si) film on the substrate and crystallizing the deposited a-Si film using laser annealing to form polycrystalline silicon.

FIGS. 3A through 3G are sectional views schematically illustrating a process flow to obtain the LCD array substrate of FIG. 2, in which the sectional views are taken along the line A I-I' of FIG. 2. In the process shown in FIGS. 3A through 3G, an array substrate employing a p-Si TFT is used, and respective patterns are formed by transferring patterns of a mask onto a substrate having a thin film formed thereon. For example, a photolithography process is used that includes photoresist coating, mask alignment, exposure of the photoresist through the mask, and development of the photoresist.

Referring to FIG. 3A, a buffer layer 30 is formed on the entire surface of an insulating substrate 1 using a first insulating material, and a polysilicon active layer 32a is then formed on the buffer layer 30 using a first mask process.

The active layer 32a is formed by depositing an amorphous silicon layer on the buffer layer 30, performing dehydrogenation of the amorphous silicon layer, and crystallizing the amorphous silicon layer into polysilicon layer by a heat treatment.

Referring to FIG. 3B, after the process of FIG. 3A, a second insulating material and a first metal film are sequentially deposited and patterned by a second mask process to form a gate insulating layer 36 and a gate electrode 38 at a middle portion of the active layer 32a (shown in FIGS. 3D and 3E).

Also, to form a channel region and a heavily impurity-doped source and drain regions in the active layer 32a, both exposed edges of the active layer 32a are ion-doped using the gate electrode 38 as a mask.

Referring to FIG. 3C, after the process of FIG. 3B, a first insulating layer 40 is formed of a third insulating material on a resultant structure of the substrate 1.

Referring to FIG. 3D, after the process of FIG. 3C, a third insulating material is deposited and then patterned by a third mask process to form a second insulating layer 44 having first and second ohmic contact holes 46a and 46b that partially expose both edges of the active layer 32a. Alternatively, the first and second insulating layers 40 and 44 may be formed as a single layer.

In both edges of the active layer 32a, the left edge is a source region 1a connected with a source electrode to be formed by a subsequent process and the right edge is a drain region 1b to be connected with a drain electrode. Next, both exposed edges of the active layer 32a are heavily doped with impurity ions to form ohmic contact layers 32b and 32c.

Next, referring to FIG. 3E, a third metal film is deposited and then patterned by a fourth mask process to form a drain electrode 50 and a source electrode 52. At this time, the drain electrode 50 is connected with the ohmic contact layer 32c of the drain region Ib through the first ohmic contact hole (46a of FIG. 3D), and the source electrode 52 is connected with the ohmic contact layer 32b of the source region Ia through the second ohmic contact hole (46b of FIG. 3D).

In this process, a TFT (T) is formed that includes the semiconductor layer 32, the gate electrode 38, and the source and drain electrodes 52 and 50. The gate electrode 38 is connected with the gate line (not shown), and the source electrode 52 is connected with the data line (not shown).

Next, referring to FIG. 3F, after the process of FIG. 3E, a fourth insulating material is deposited on a resultant structure of the substrate 1 and then patterned by a fifth mask process to form a third insulating layer 54 having a drain contact hole 56.

Next, referring to FIG. 3G, an indium tin oxide (ITO) transparent conductive layer is deposited on a resultant structure of the substrate 1 including the drain contact hole 56 and then patterned by a sixth mask process to form a pixel electrode 62. The indium tin oxide forms a low resistance contact with a metal when a TAB bonded.

As described above, the related art LCD array substrate is fabricated by six masking steps.

The respective mask processes represent a series of processes for forming a desired pattern in a thin film formed on a substrate. Each masking process transfers a pattern of a mask onto the thin film and includes the steps of photoresist coating, exposure, and developing, and the like.

As the number of the mask processes increases, production yield is lowered and the probability of incurring defects is increased. Also, since masks designed for forming patterns are very expensive, the increase in the number of the masks used in the fabrication of the array substrate increases the fabrication costs of the LCD.

SUMMARY OF THE INVENTION

Accordingly, the present invention is directed to an array substrate of an LCD and fabrication method thereof that substantially obviates one or more problems due to limitations and disadvantages of the related art.

In accordance with an embodiment of the invention, there is provided an array substrate of an LCD including a substrate. An active layer, a first insulating layer, and a gate electrode sequentially are formed on the substrate. A source region and a drain region reside in predetermined regions of the active layer and each is doped with impurity ions. A second insulating layer overlies an entire surface of the substrate including the gate electrode. A pixel electrode resides on the second insulating layer. First and second contact holes reside in the first and second insulating layer and expose portions of the source region and the drain region, respectively. A portion of a source electrode contacts the source region through the first contact hole and a first portion of a drain electrode contacts the drain region and a second portion of the pixel electrode.

According to another aspect of the present invention, there is provided a method of fabricating an array substrate of an LCD. The method includes sequentially forming an active layer, a first insulating layer, and a gate electrode on a substrate. A source region and a drain region are formed on predetermined regions of the active layer by implanting impurity ions into the predetermined regions of the active layer. A second insulating layer is formed on an entire surface of the substrate including the gate electrode. A pixel electrode is formed on the second insulating layer, and first and second contact holes are formed by removing a portion of the first and second insulating layer overlying the source region and the drain region. A source electrode is formed in which a portion contacts the source region through the first contact hole, and a drain electrode is formed in which a first portion contacts the drain region and a second portion contacts the pixel electrode.

According to a further aspect of the present invention, there is provided a method of fabricating an array substrate of an LCD. The method includes forming an active layer on a substrate using a first mask process and depositing a first insulating layer and a first metal layer on the substrate. The first metal layer is patterned using a second mask process to form a gate electrode. A source region and a drain region are formed on predetermined regions of the active layer by implanting impurity ions into the predetermined regions of the active layer. A second insulating layer and a transparent conductive film are deposited on an entire surface of a resultant substrate including the gate electrode. A portion of the first and second insulating layers and the transparent conductive film are removed using a third mask process to form first and second contact holes partially exposing the source and drain electrodes, and a pixel electrode. A second metal layer is deposited on the substrate and patterned using a fourth mask process to form a source electrode and a drain electrode, such that the source electrode is connected to the source region through the first contact hole and the drain electrode is connected to the drain electrode through the second contact hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

The present invention will now be described with reference to the accompanying drawings, in which exemplary embodiments of the invention are shown.

FIGS. 4A through 4F are sectional views schematically illustrating a process flow of an LCD array substrate according to an embodiment of the present invention. FIGS. 4A through 4F can be compared with FIGS. 3A through 3G and show that the number of the masks used in the illustrated embodiment of the invention are reduced compared with that in the related art process of FIGS. 3A through 3G.

Figure 1:
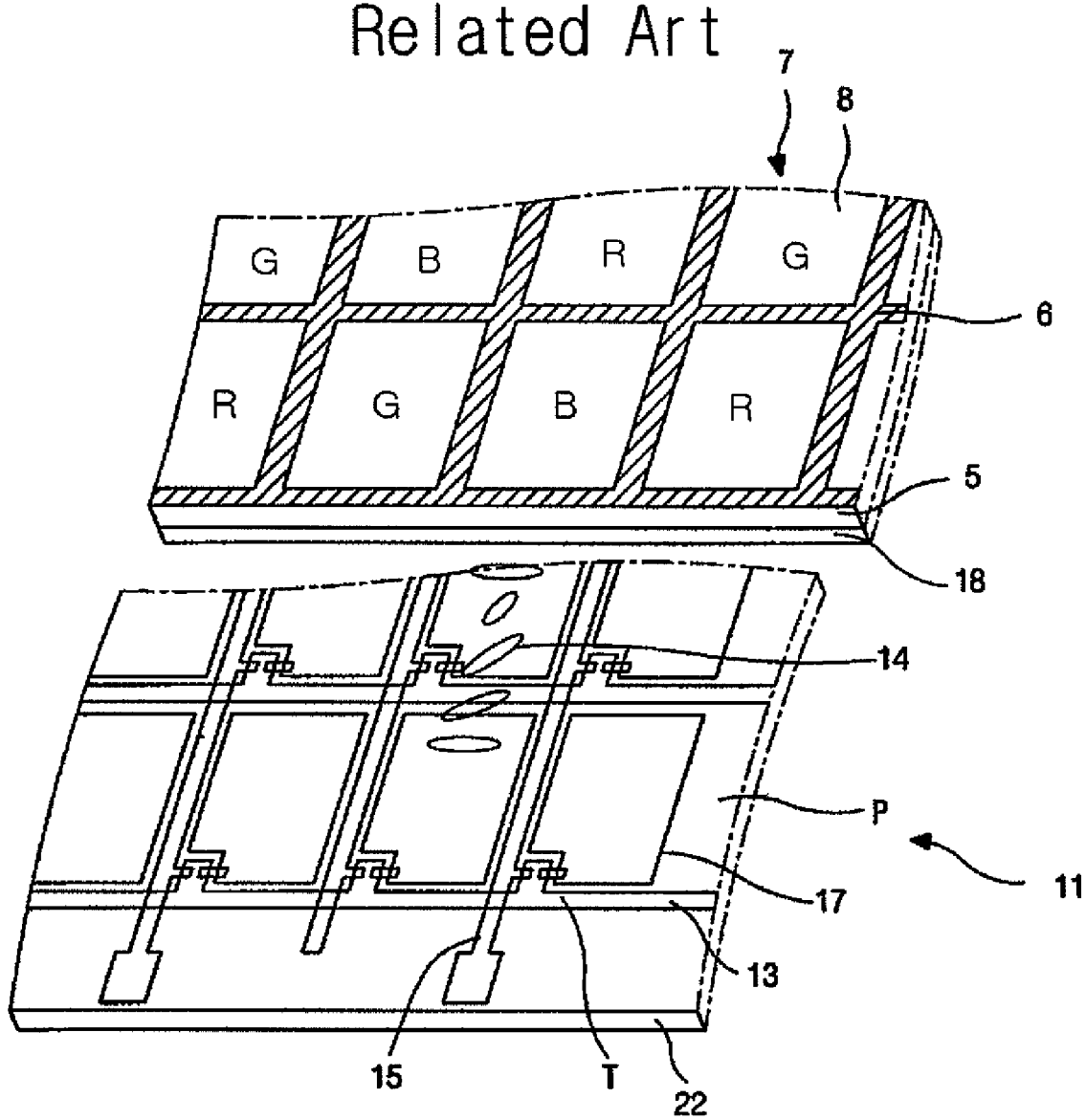
FIG. 1 is a partial exploded perspective view of a related art LCD.
Figure 2:
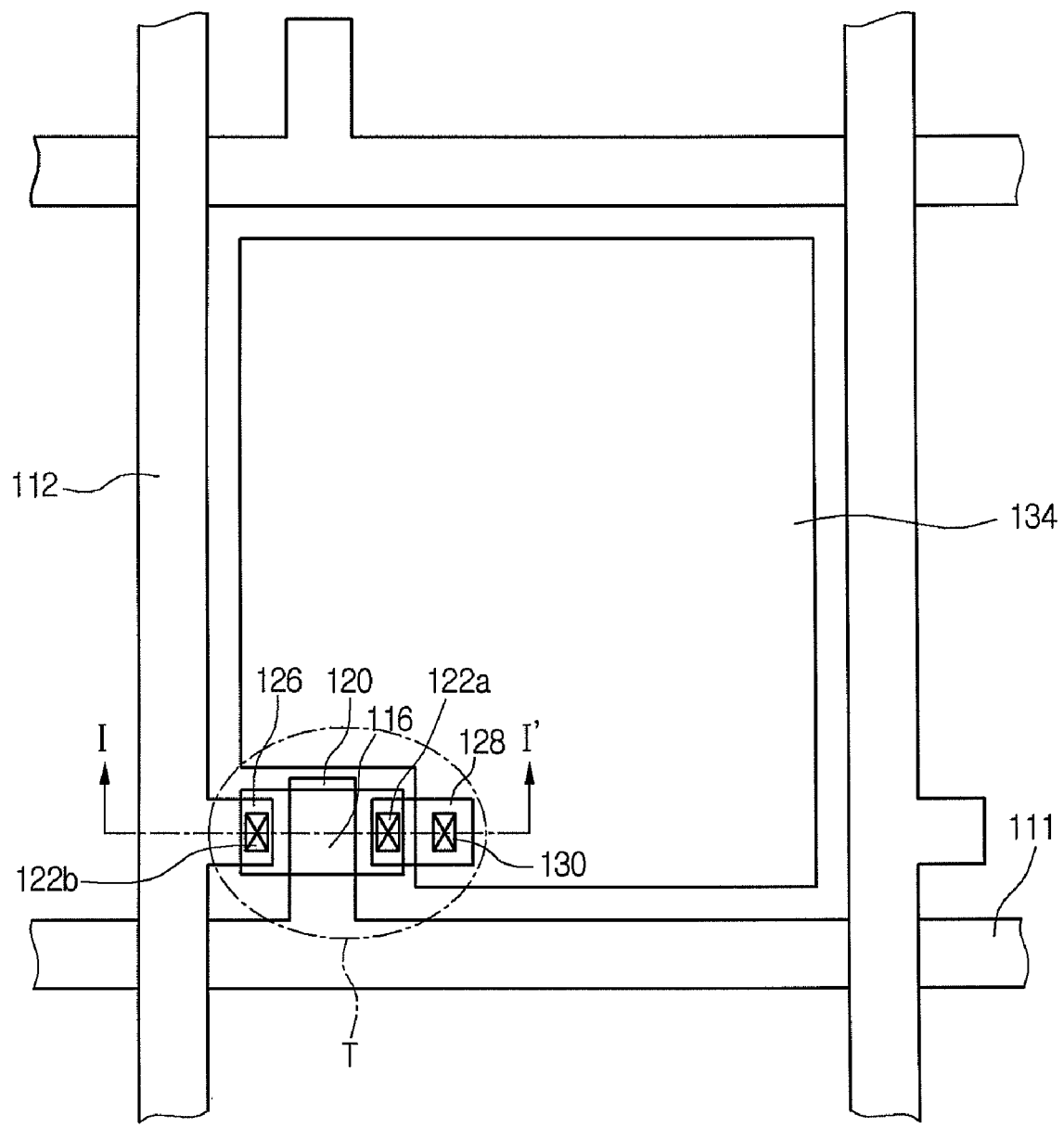
FIG. 2 is a partially magnified plan view of some pixels of a related art LCD array substrate.
Figure 3A:
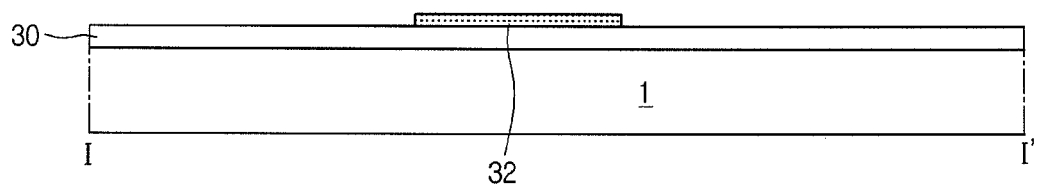
FIGS. 3A through 3G are sectional views schematically illustrating a process flow of a related art LCD array substrate.
Figure 3B:
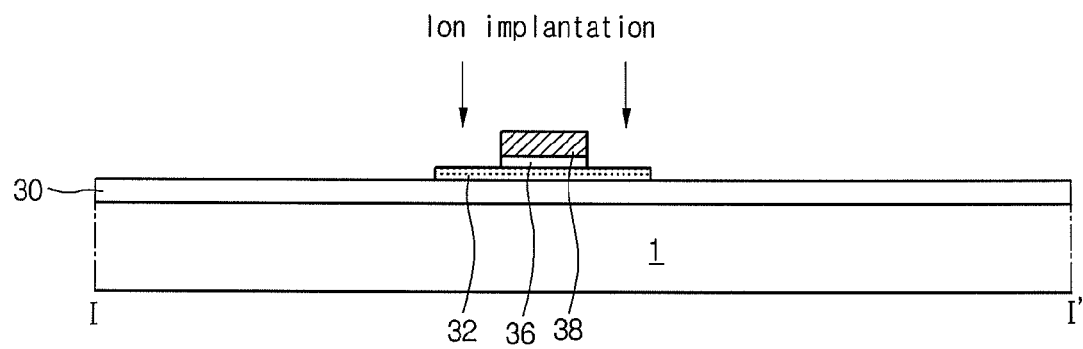
Figure 3C:
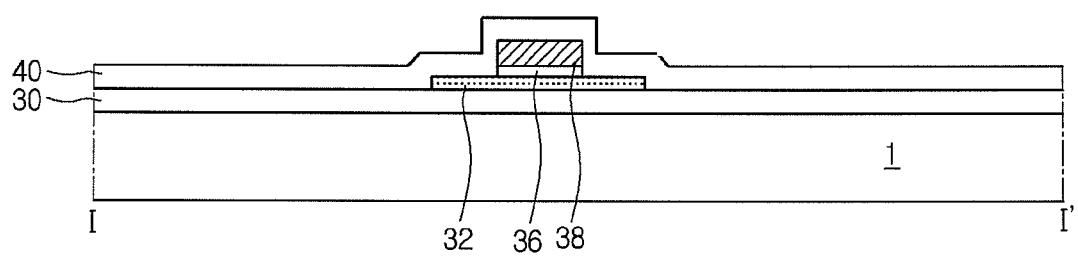
Figure 3D:
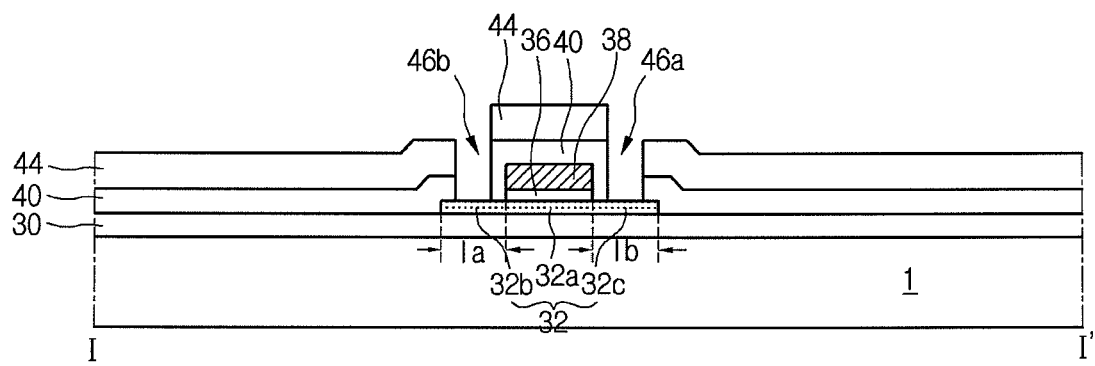
Figure 3E:
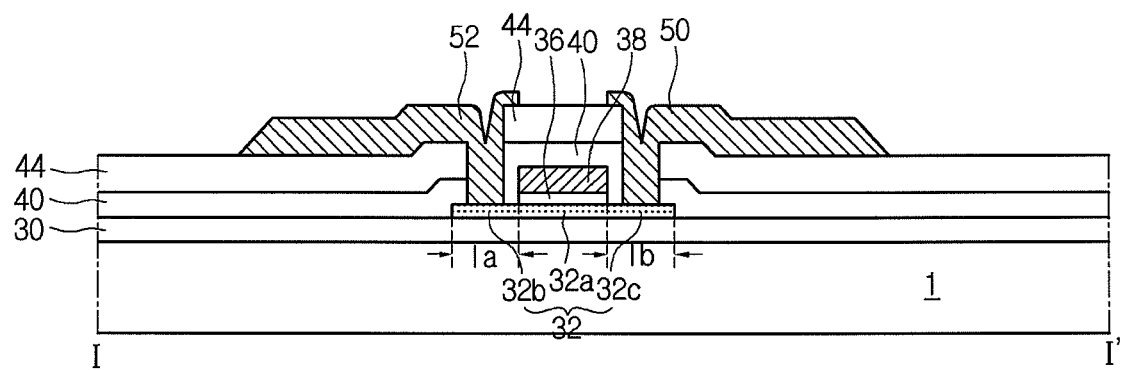
Figure 3F:
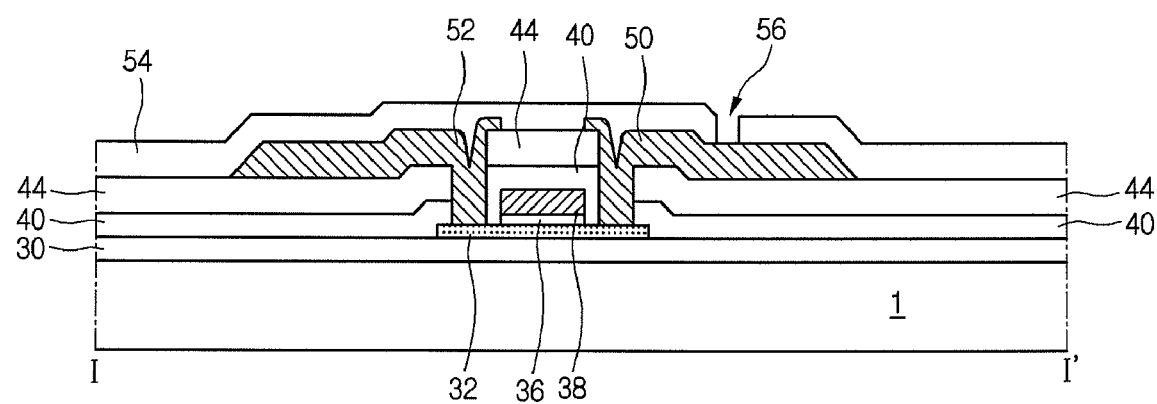
Figure 3G:
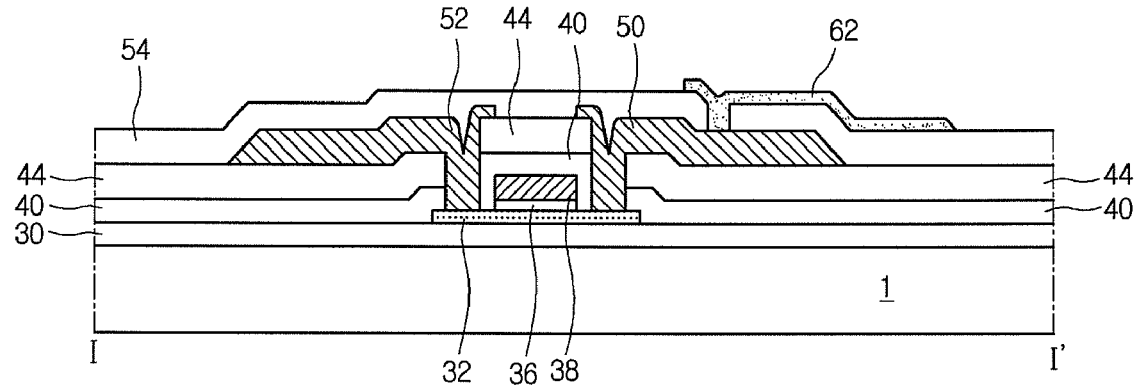
Figure 4A:
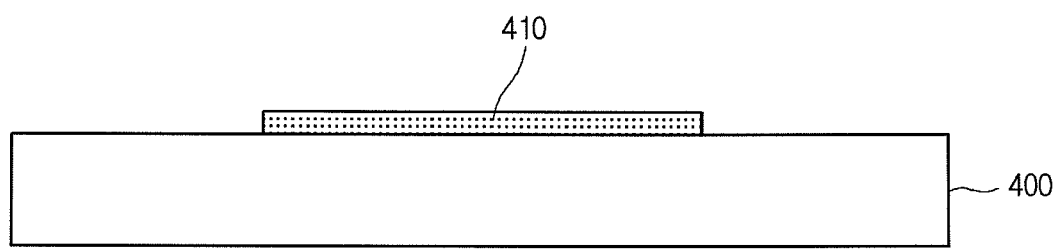
FIGS. 4A through 4F are sectional views schematically illustrating a process flow of an LCD array substrate according to an embodiment of the present invention.

Referring to FIG. 4A, a transparent insulating substrate 400 is prepared. Then, a thin polysilicon film is deposited then patterned by a first mask process (not shown) to form an active layer 410. The active layer 410 can be formed by depositing a thin amorphous silicon film on the substrate and then crystallizing the deposited amorphous silicon film.

The amorphous silicon film can be deposited by a variety of methods, such as low pressure chemical vapor deposition (LPCVD) or plasma enhanced chemical vapor deposition (PECVD).

The crystallization of the amorphous silicon film can be performed by a solid phase crystallization method or an eximer laser annealing (ELA) method. The ELA method uses a pulse type laser beam.

In addition to the aforementioned crystallization methods, a sequential lateral solidification (SLS) method has been proposed and has been widely researched. The SLS method grows grains in a lateral direction to greatly enhance the crystallization characteristic.

The SLS method exhibits the tendency of the grains to grow in a direction perpendicular to a boundary between liquid phase silicon and solid phase silicon. See, for example, Robert S. Sposili, M. A. Crowder, and James S. Im, Mat. Res. Soc. Symp. Proc. Vol. 452, 956-957, 1997. This method properly controls size and irradiation range of the laser beam to laterally grow the grains up to a desired length, thereby increasing the silicon grain size.

Alternatively, although not shown in the drawings, prior to forming the active layer 410, a buffer layer such as a silicon dioxide ($SiO_2$) or silicon nitride ($Si_xN_y$) may be formed on the substrate.

The buffer layer prevents impurities such as Na or the like from penetrating into an upper layer during the process (particularly, during the crystallization).

After the crystallization of the amorphous silicon film, a dehydrogenation process is performed to reduce the amount of hydrogen atoms in the amorphous silicon film.

Figure 4B:
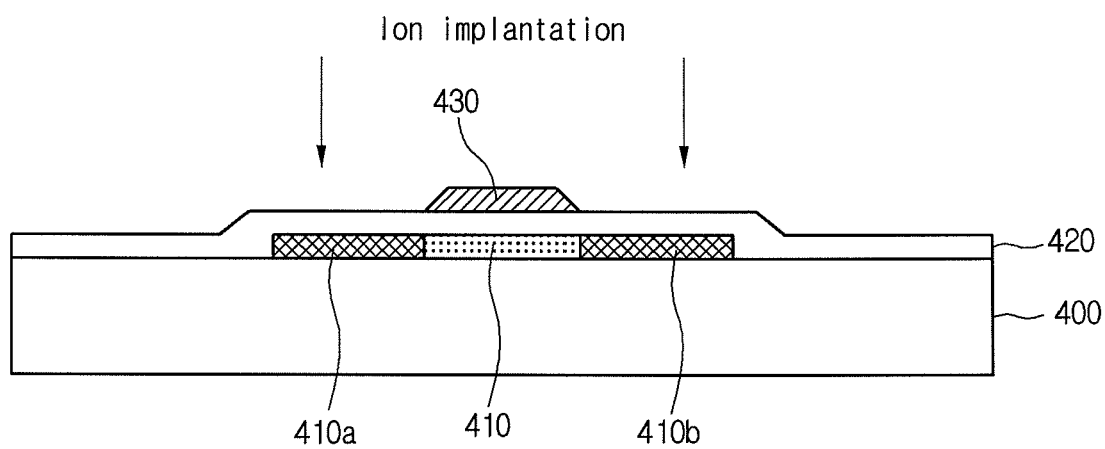

Next, referring to FIG. 4B, a first insulating layer 420 and a first metal layer (not shown) are sequentially deposited on the substrate 400 including the active layer 410. The first insulating layer 420 is a gate insulating layer and is formed of silicon oxide or silicon nitride. Also, the metal layer is formed in a single layer of Al, Mo and Cu, or a dual layer of Al and Mo. The deposited metal layer is then patterned by a second mask process (not shown) to form a gate electrode 430 over the active layer 410.

Next, impurity ions are implanted into the active layer 410 using the gate electrode 430 as an implant mask to form a source region 410a and a drain region 410b at both edges of the active layer 410, respectively.

At this time, the electrical properties of the active layer 410 are varied depending on the conductivity type of the implanted dopants. For example, when the implanted dopants are a Group III element such as boron (B), the active layer 410 serves as a component of a P-type TFT, whereas when the implanted dopants are a group V element such as phosphorous (P), the active layer 410 serves as a component of an N-type TFT.

Alternatively, the active layer 410 may have lightly doped drain (LDD) regions at upper surfaces of the source and drain regions. The LDD regions are formed by implanting impurity ions into the active layer 410 at a relatively low concentration compared to the sources and drain regions.

Figure 4C:
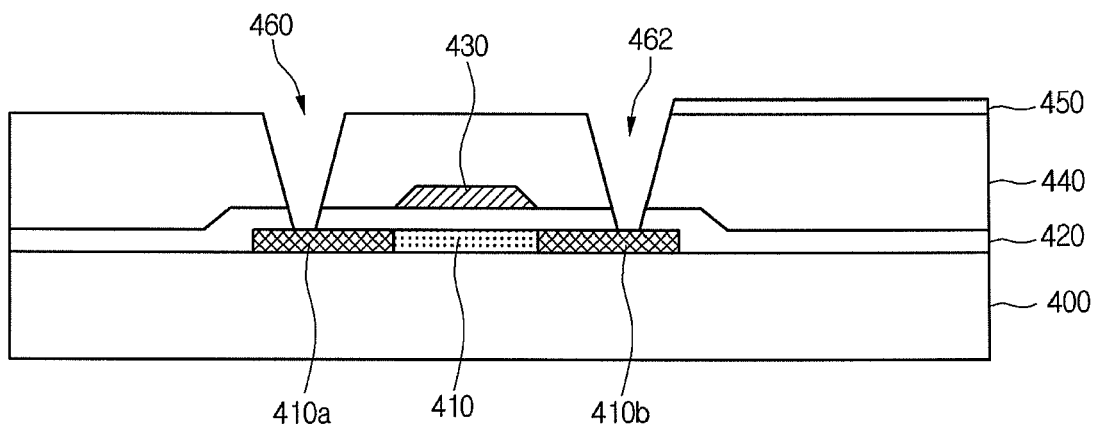

Referring to FIG. 4C, after forming the source and drain regions 410a and 410b, a second insulating layer 440 and a transparent conductive layer are sequentially deposited on a resultant structure of the substrate 400 including the gate electrode 430. These layers are then patterned by a third mask process (not shown) to form a first contact hole 460 exposing the source region 410a, a second contact hole 462 exposing the drain region 410b, and a pixel electrode 450.

In the third mask process, since the first contact hole 460, the second contact hole 462, and the pixel electrode 450 are preferably formed in one mask process, a diffraction mask or a half-tone mask is used.

In accordance with an embodiment of the invention, the diffraction mask has a slit structure having a plurality of slit regions corresponding to light transmission regions. The amount of the light transmitting through the slit regions of the diffraction mask is smaller than that transmitting through a full transmission region. Hence, when a photoresist film is exposed using the diffraction mask having the slit regions and the full transmission regions, the thickness of the photoresist film remaining in the slit regions is different than that of the photoresist film remaining in the full transmission regions.

In other words, when the photoresist film is a positive type photoresist, the photoresist film which is exposed to the light irradiated through the slit regions is formed thicker than that which is exposed to the light irradiated through the full transmission regions. When the photoresist film is a negative type, the photoresist film which is exposed to the light irradiated through the full transmission regions is formed thicker than that which is exposed to the light irradiated through the slit regions.

In another embodiment of the invention, instead of the slit regions of the diffraction mask, half-tone regions are used to obtain the same exposure effect.

In particular, in the present invention, the diffraction patterns, that is, diffraction slits, are continuously arranged in a vertical direction or a horizontal direction to form a large-sized screen. As a result, the contact holes and the pixel electrode can be concurrently formed by one mask process, which will be described in more detail with reference to FIGS. 5A through 5E.

Figure 4D:
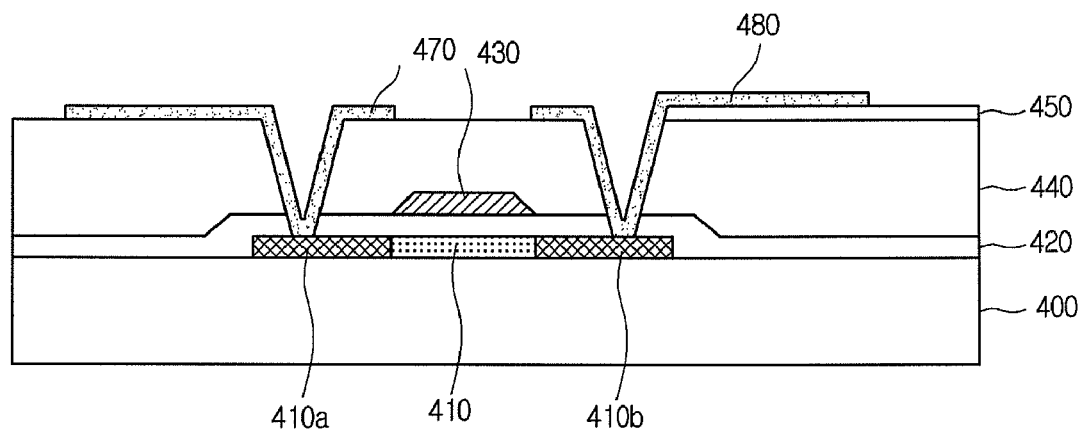

Referring to FIG. 4D, after the first contact hole 460, the second contact hole 462, and the pixel electrode 450 are formed using the third mask process, a second metal layer (not shown) such as Mo, or Mo alloy (ex. MoTa, MoW) is deposited on a resultant structure of the substrate 400.

The deposited second metal layer is patterned using a fourth mask process (not shown) to form a source electrode 470 and a drain electrode 480. The source electrode 470 is electrically connected with the source region 410a through the first contact hole 460. Also, the drain electrode 480 has one edge electrically connected with the drain region 410b through the second contact hole 462, and the other edge electrically connected with the pixel electrode 450. Also, the source electrode 470 is also connected with the data line (not shown).

As described above, the LCD array substrate of the present invention is fabricated by four mask processes. Hence, compared with the fabrication method of the array substrate according to the related art, the present embodiment can omit two mask processes. Accordingly, enhancement in productivity and reduced production costs are obtained.

Figure 4E:
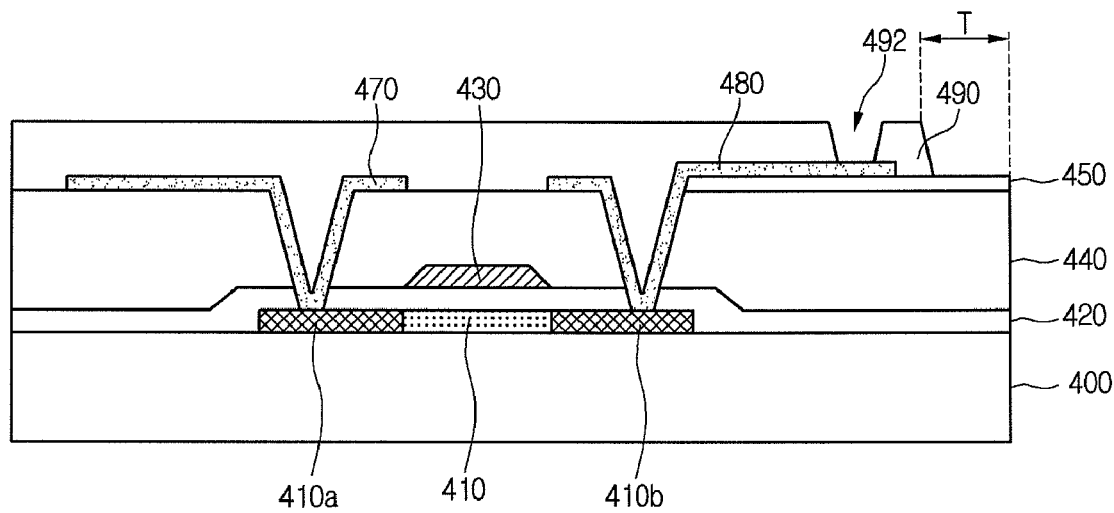
Figure 4F:
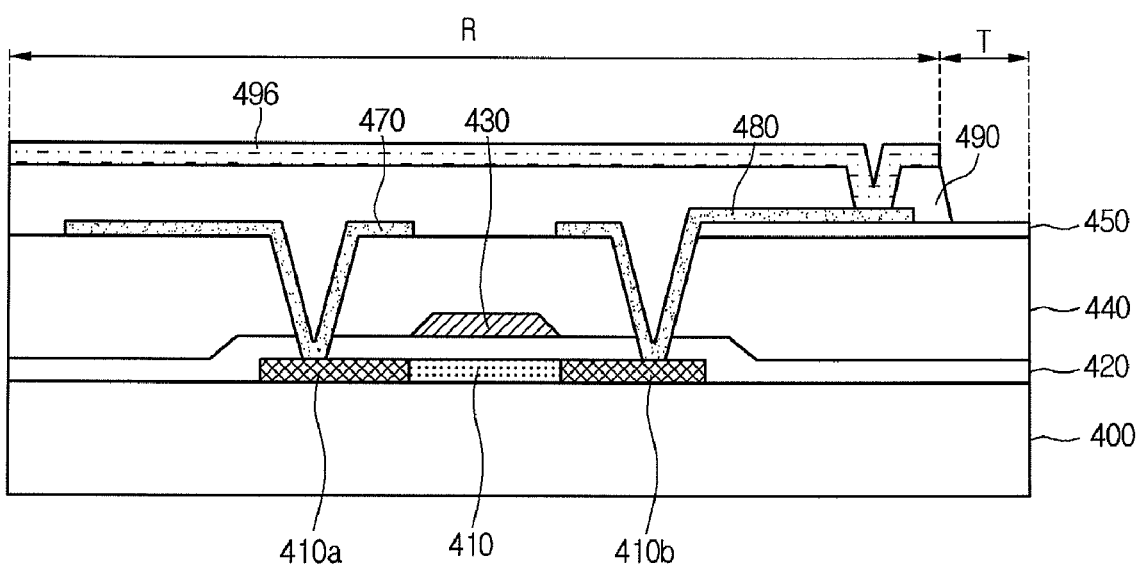

The present invention makes it possible to form a transmission type LCD through the processes of FIGS. 4A through 4D and can also combine the role of a reflection type LCD through added processes of FIGS. 4E and 4F.

That is, as shown in FIG. 4E, a third insulating layer 490 is deposited on an entire surface of the substrate 400 including the source and drain electrodes 470 and 480, and is then patterned to form a third contact hole 492. The third contact hole 492 partially exposes the drain electrode 480 and exposes a transmission part T of the pixel electrode 450.

Next, as shown in FIG. 4F, a second metal layer is deposited on the third insulating layer 490 including the third contact hole 492 and is then patterned by an added sixth mask process (not shown) to form a reflection electrode 496, while exposing the transmission part T. The reflection electrode 496 is electrically connected with the drain electrode 480 through the third contact hole 492, and serves as a reflection part R.

FIGS. 5A through 5E are sectional views illustrating an exemplary third mask process in a fabrication method of an LCD array substrate according to an embodiment of the present invention.

Figure 5A:
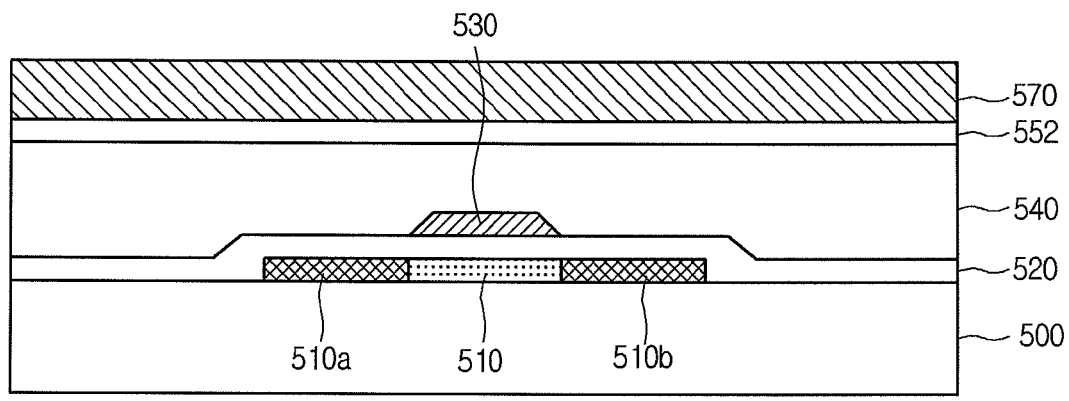
FIGS. 5A through 5E are sectional views exemplarily illustrating a third mask process described in FIG. 4C according to an embodiment of the present invention.

First, as shown in FIG. 5A, a second insulating layer 540 and a transparent conductive layer 552 are sequentially deposited on a resultant structure of a substrate 500 that includes a semiconductor layer 500, a first insulating layer 520, and a gate electrode 530. Thereafter, a photoresist film 570 is coated on the transparent conductive layer 552. In the present embodiment, the second insulating layer 540 is a planarizing film made of organic insulating material.

Figure 5B:
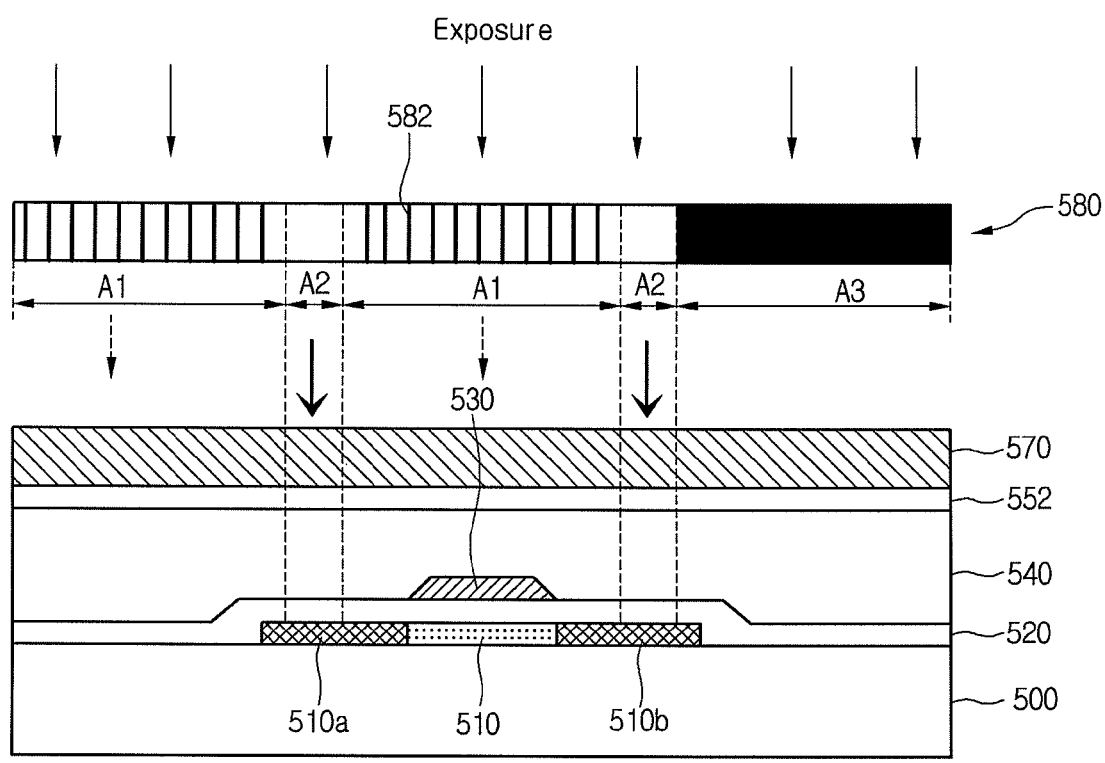

Next, referring to FIG. 5B, the photoresist film 570 is exposed to a light by using a diffraction mask 580 according to an embodiment of the present invention. The diffraction mask 580 includes a first transmission region A1 for partially transmitting the incident light, a second transmission region A2 for completely transmitting the incident light, and a blocking region A3 for completely blocking the incident light. Accordingly, the incident light is irradiated onto the photoresist film 570 through the first transmission region A1 and the second transmission region A2 of the diffraction mask.

Figure 5C:
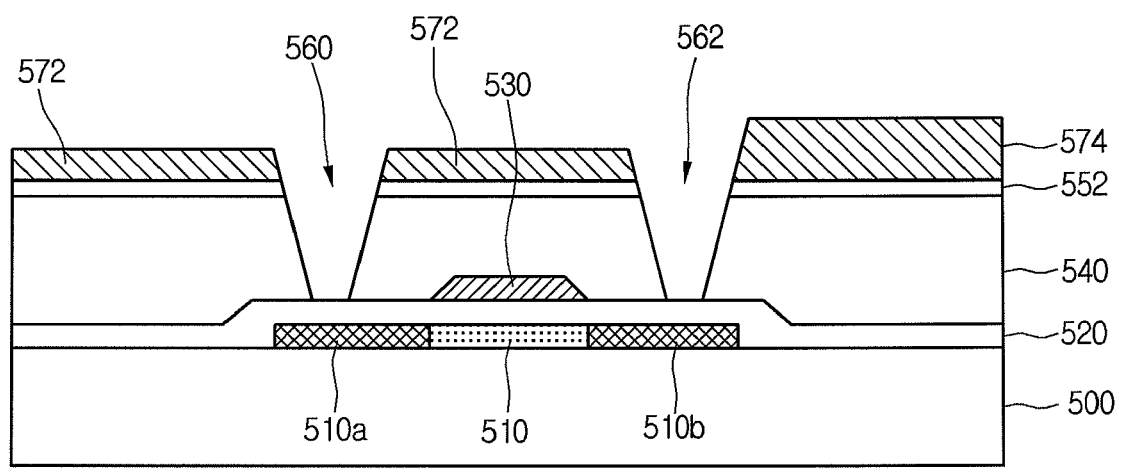

Next, referring to FIGS. 5B and 5C, the exposed photoresist film 570 is developed, so that the photoresist film in the first transmission region A1 and the blocking region A3 remains but the photoresist film in the second transmission region A2 is removed. Although the positive photoresist film is exemplarily described, a negative photoresist film can be also used.

After developing the photoresist film 570, a first photoresist pattern 572 is formed corresponding to the first transmission region A1, which is thinner than a second photoresist pattern 574 corresponding to the blocking region A3.

The transparent conductive layer 552 and the second insulating layer 540 are patterned by using the first and second photoresist patterns 572 and 574 as a mask, thereby forming a first contact hole 560 and a second contact hole 562.

Figure 5D:
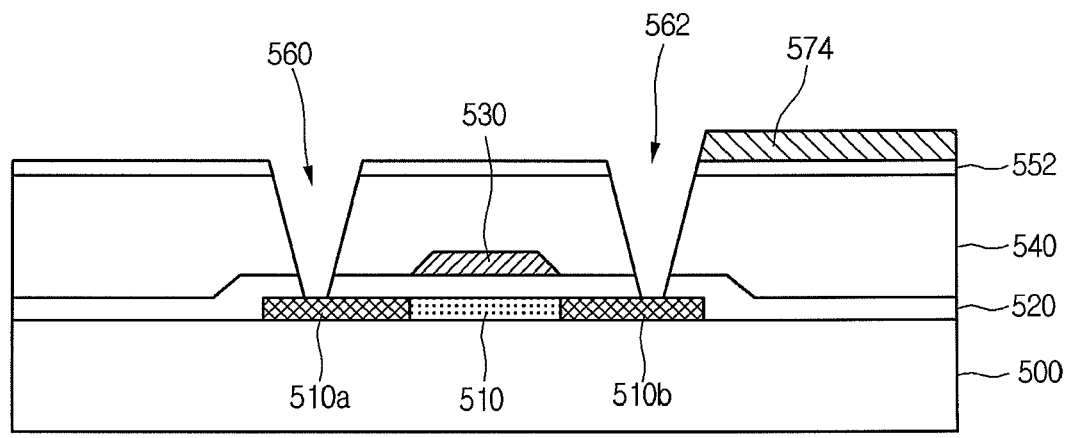

Next, referring to FIG. 5D, after the first and second contact holes 560 and 562 are formed, the first photoresist pattern 572 is removed by an ashing process. The second photoresist pattern 574 is also partially removed such that its thickness is reduced.

Figure 5E:
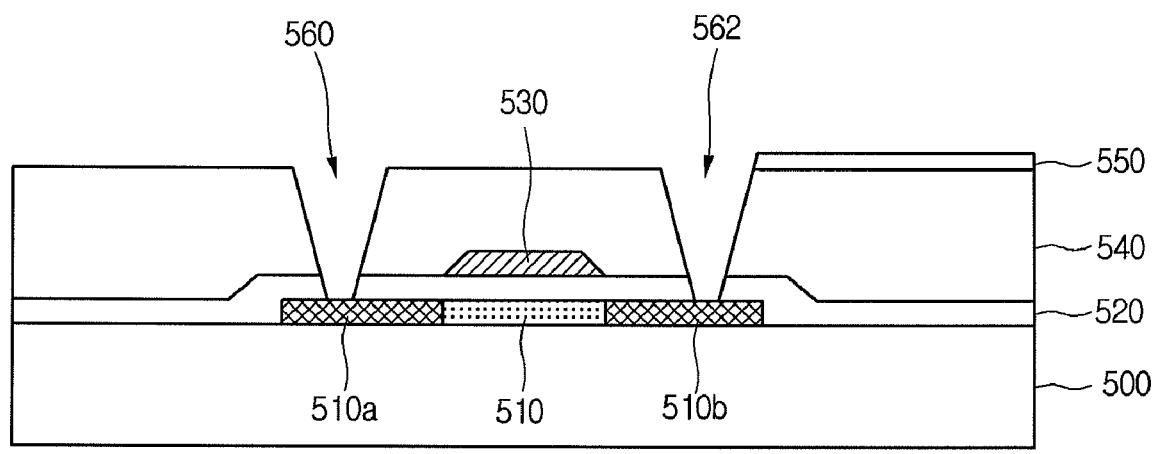

Next, referring to FIG. 5E, the exposed conductive layer 552 is etched by using the second photoresist pattern 574 as a mask, thereby forming a pixel electrode 550. The second photoresist pattern 574 is then removed using a stripper.

In the aforementioned third mask process, the first and second contact holes 560 and 562 and the pixel electrode 550 are formed by one mask process using the diffraction mask 580. In particular, the first transmission regions A1 each employing diffraction slits 582 are positioned throughout an entire pixel region except for the regions where the first and second contact holes and the pixel electrode 550 are formed, as shown in FIG. 5B. For this purpose, the present invention utilizes the diffraction mask capable of performing diffraction in a large area, which will be described below in detail.

Although the embodiment set forth above describes a process in which the second insulating layer 540 is an organic insulating material, the second insulating layer can also be an inorganic material. As will subsequently be described in connection with another embodiment of the invention, when the second insulating layer is an inorganic material, step coverage problems can arise. In particular, because the inorganic material is deposited as a thin layer, the inorganic film can become very thin in regions overlying previously formed metal layers.

Figure 6:
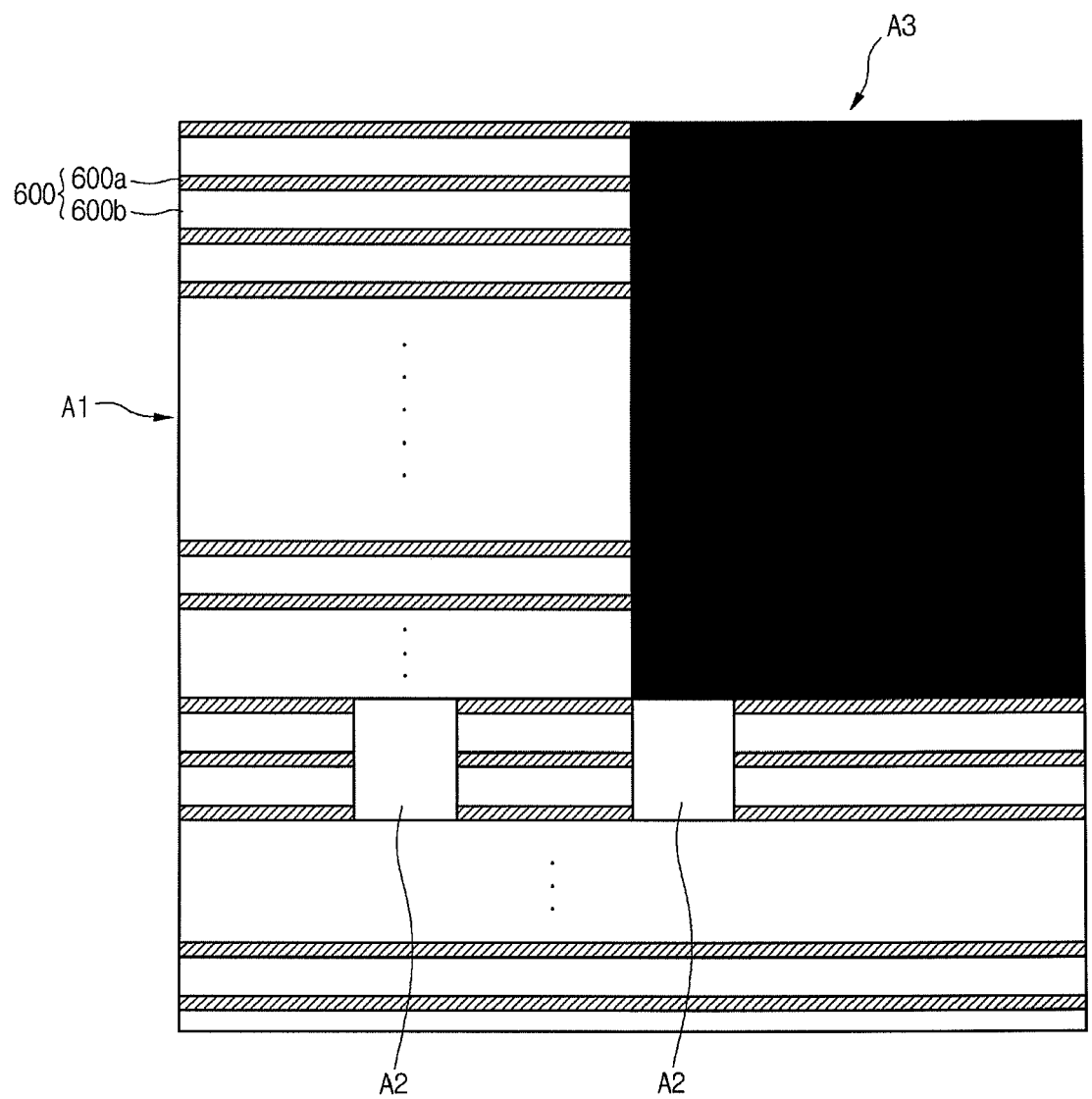
FIG. 6 is a partial plan view of a diffraction mask used in a fabrication method of an LCD array substrate according to an embodiment of the present invention.

FIG. 6 is a partial plan view of a diffraction mask used in a fabrication method of an LCD array substrate according to an embodiment of the present invention. The diffraction mask is used in the third mask process described in FIG. 4C for a large-sized screen. Only a portion of the mask corresponding to a unit pixel region is shown. In particular, the diffraction mask of FIG. 6 is one designed for application to a positive photoresist film, but the present invention is not limited thereto.

Referring to FIGS. 5B and 6, the diffraction mask 580 includes the second transmission region A2 for forming the contact hole, and the blocking region A3 for forming the pixel electrode. Also, the diffraction mask further includes the first transmission region A1 having a plurality of slits 600 arranged continuously and having a large area.

In FIG. 6, the slits 600 are arranged in a row direction. Alternatively, the slits 600 may be formed in a column direction or in the form of dots.

Referring to FIGS. 5B through 5E, the second transmission region A2 completely transmits the incident light such that contact holes 560 and 562 partially exposing source and drain regions 510a and 510b are formed. The first transmission region A1 is formed in a diffraction pattern to partially transmit the incident light such that the pixel electrode 550 is formed only at the blocking region A3.

As shown in FIG. 6, the diffraction pattern 600 of the first transmission region A1 includes bars 600a for partially blocking light and spaces 600b for transmitting light. The bars 600a or the spaces 600b may be designed to have a width ranging from about 1.0 μm to about 2.0 μm and can be varied depending on the particular exposure apparatus and process recipe.

Although, the above embodiment shows and describes that the second insulating layer 540 is formed of an organic insulating material.

Thus, when a metal layer exists below the diffraction-exposed region, the irradiated light is reflected by the metal, so that the photoresist film above the metal layer is made non uniform and thereby a process failure may be caused.

Figure 7A:
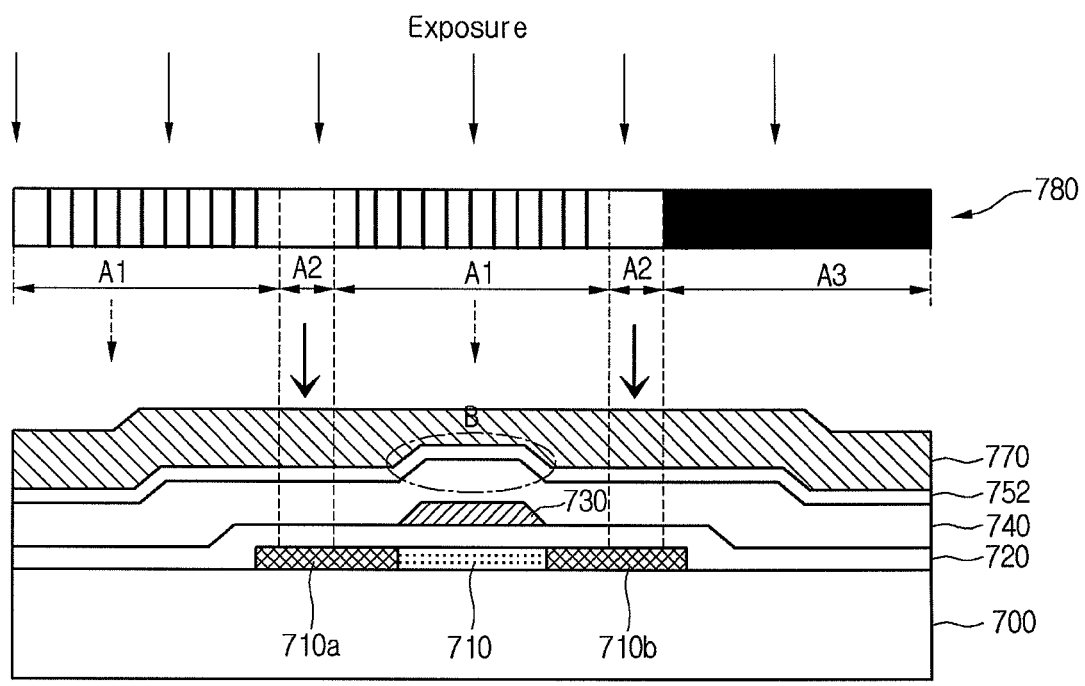
FIGS. 7A through 7C are sectional views illustrating a problem due to a diffraction exposure in a third mask process.
Figure 7B:
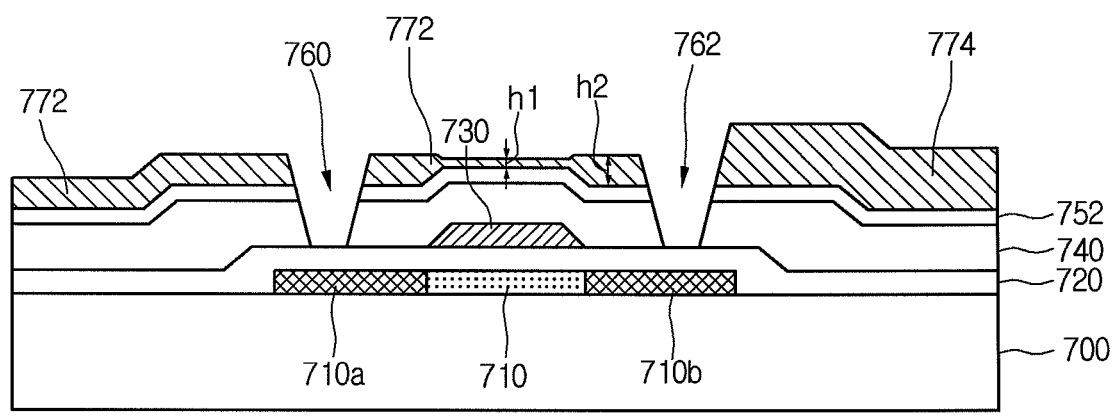
Figure 7C:
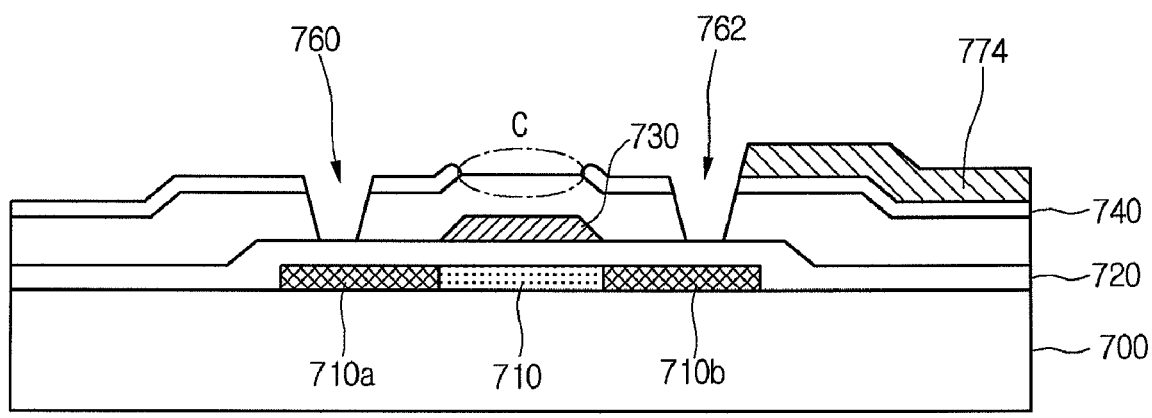

FIGS. 7A through 7C are sectional views illustrating a drawback of the diffraction exposure in the third mask process.

With reference to these figures, which can be compared with the processes of FIGS. 5A through 5D, a drawback caused by a metal layer formed below the diffraction-exposed portion will be described for the case where the gate electrode when the second insulating layer is made of inorganic insulating material and not organic insulating material.

Referring to FIG. 7A, a second insulating layer 740 and a transparent conductive layer 752 are deposited on a substrate 700. The substrate 700 includes an active layer 710, a first insulating layer 720, a gate electrode 730, and a photoresist film 770 on the transparent conductive layer 752. In this state, light is irradiated onto the photoresist film 770 through a diffraction mask 780.

Then, since the second insulating layer 740 is made of inorganic insulating material and is very thin compared with an organic insulating material, it exhibits a height difference due to the underlying metal layer or the like.

The diffraction mask 780 includes a first transmission region A1 for partially transmitting incident light, a second transmission region A2 for completely transmitting the incident light, and a blocking region A3 for completely blocking the incident light. In the illustrated structure, region B where the gate electrode 730 is formed has a height difference compared to the remaining portions of the device.

Next, the photoresist film that is exposed to the light through the diffraction mask 780 is developed to form a first photoresist pattern 772 and a second photoresist pattern 774. That is, by developing the photoresist film, the photoresist film is left at regions where the light is irradiated through the first transmission region and the blocking region of the diffraction mask 780, but is removed at the second transmission region where the light is completely irradiated.

Next, referring to FIG. 7B, the exposed transparent conductive layer 752 and the underlying second insulating layer 740 are sequentially etched by using the first and second photoresist patterns 772 and 774 as a mask, thereby forming a first contact hole 760 and a second contact hole 762.

At this time, the first photoresist pattern 772 formed through the first transmission region A1 should be thinner than the second photoresist pattern 774 that was not exposed because of the presence of blocking region A3.

Also, it is important that the first photoresist pattern 772 maintain a uniform thickness so as to prevent failure in a subsequent etch process.

However, the light used for exposure of the photoresist film is reflected by the gate electrode 730. Accordingly, the thickness h1 of the photoresist film remaining on the gate electrode 730 is different than the thickness h2 of the photoresist film at a periphery of the region A1.

Accordingly, as shown in FIG. 7C, when removing the first photoresist pattern 772 using an ashing process, the portion where the photoresist film is thin (portion C) overlying the gate electrode 730 and the conductive layer 752 formed beneath the photoresist pattern are also removed. This is because the first photoresist pattern does not have a uniform thickness thick enough to stop the etchment from attacking the underlying metal.

Figure 8A:
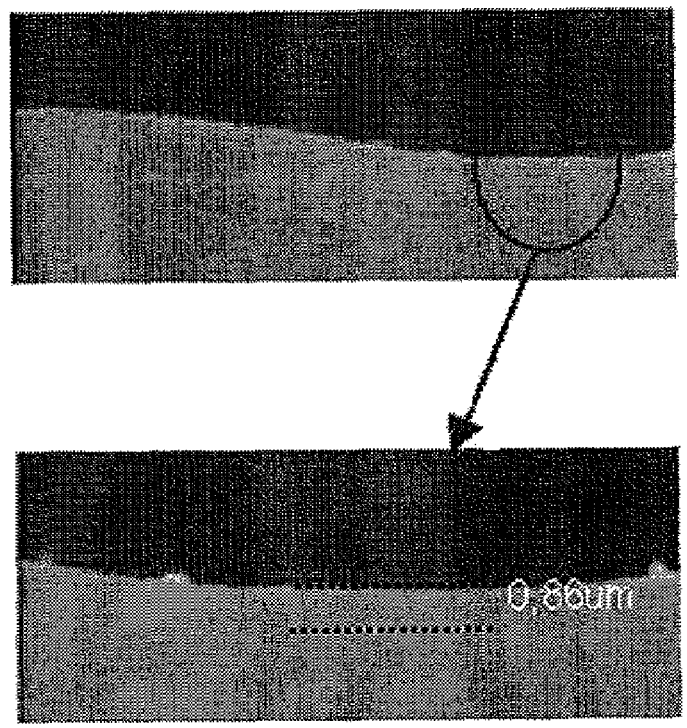
FIGS. 8A and 8B are SEM micrographs used to measure a photoresist film after a diffraction exposure.
Figure 8B:
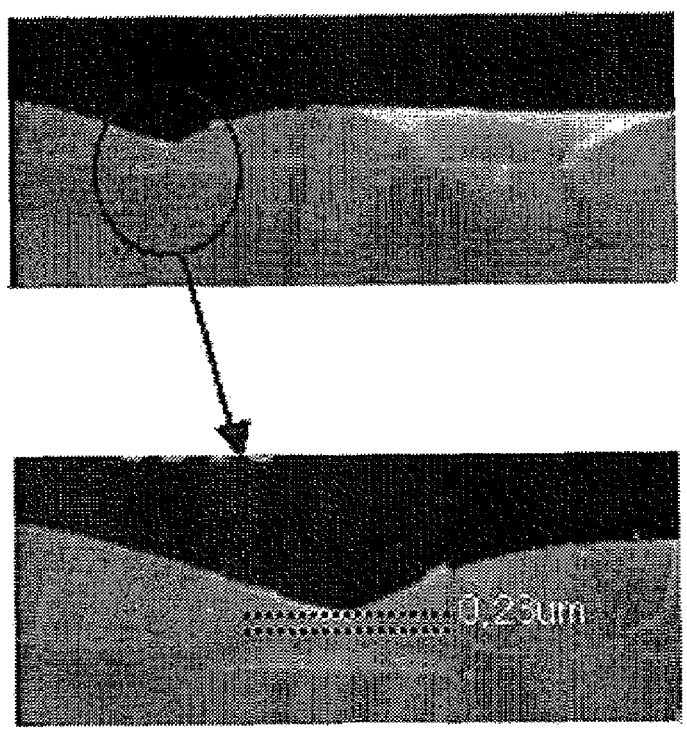

The photoresist thinning is illustrated in the SEM micrographs of FIGS. 8A and 8B.

The SEM micrographs are used to measure the photoresist film after a diffraction exposure. As shown in FIG. 8A, when a metal layer is not formed below the photoresist film, the photoresist film is 0.86 μm thick but when a metal layer is formed below the photoresist film, the photoresist film is 0.23 μm thick, which shows a considerable difference.

In a second embodiment of the present invention to overcome the above problem, in the diffraction exposure of the region where the metal layer, such as the gate electrode is formed, the width of the slit is reduced to decrease the amount of the light transmitted through the slit, thereby compensating for reflective thinning of the photoresist film.

It is noted that the second embodiment exemplifies that the second insulating layer of the LCD is made of a thin inorganic insulating material.

Figure 9A:
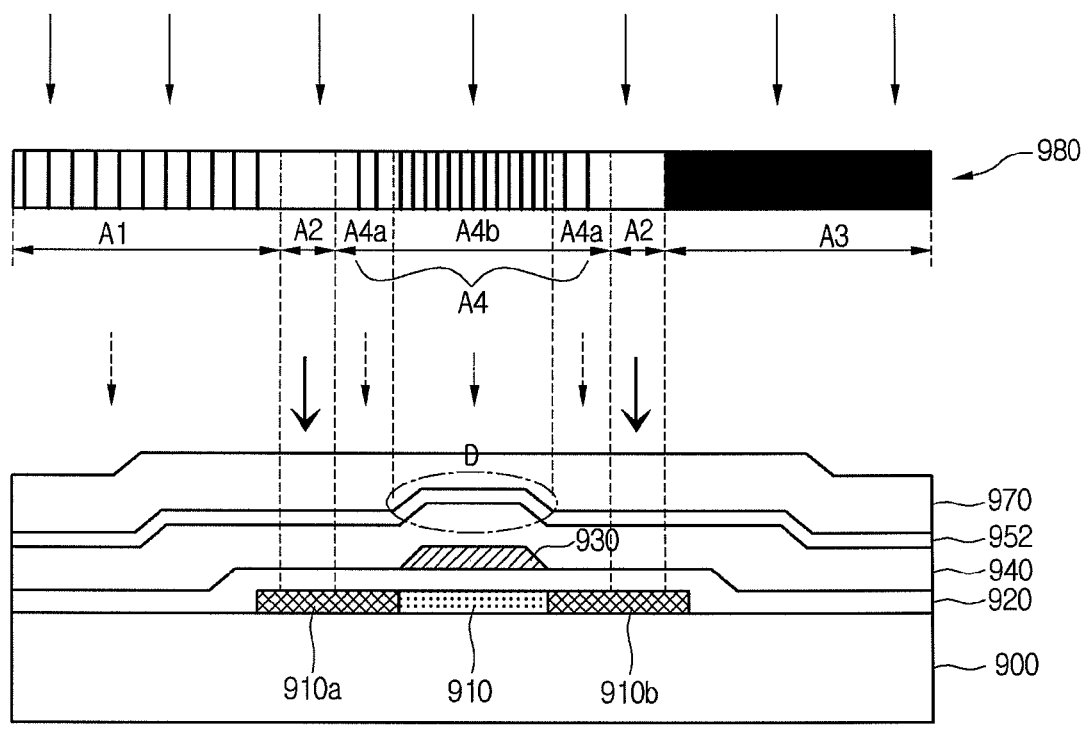
FIGS. 9A through 9C are sectional views schematically illustrating a process flow of an LCD array substrate according to another embodiment of the present invention.
Figure 9B:
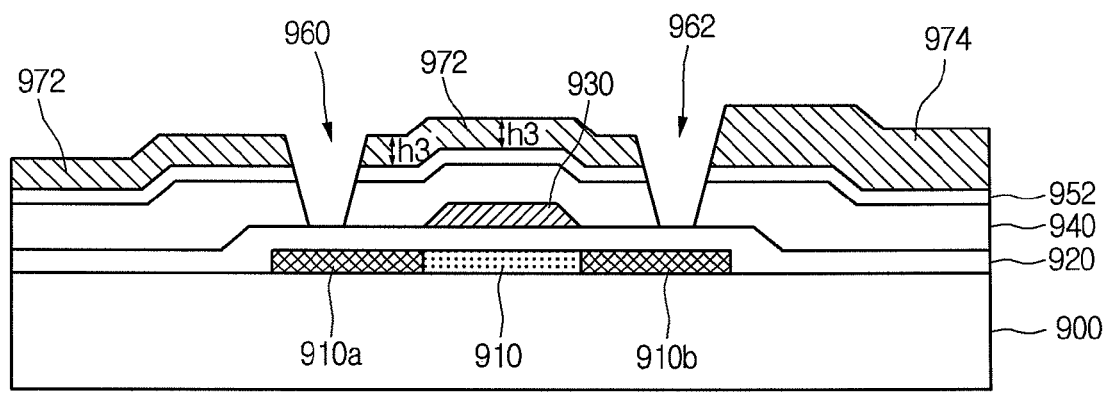
Figure 9C:
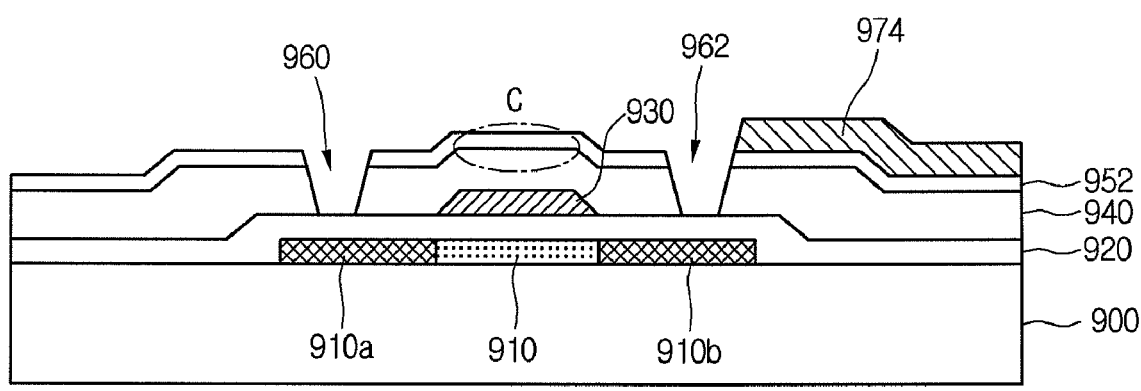

FIGS. 9A through 9C are sectional views schematically illustrating a process flow of an LCD array substrate according to another embodiment of the present invention. The fabrication method of an array substrate shown in FIGS. 9A through 9C is the same as that shown in FIG. 4 except that the width of the slit is controllable in the third mask process. Hence, the fabrication method will be described centering on a process for solving the problem mentioned in FIGS. 7A through 7C.

First, referring to FIG. 9A, a second insulating layer 940 and a transparent conductive layer 952 are deposited on a substrate 900 including an active layer 910, a first insulating layer 920, a gate electrode 930. Then, a photoresist film 970 is coated on the transparent conductive layer 952. In this state, light is irradiated onto the photoresist film 970 through a diffraction mask 980.

Herein, since the second insulating layer 940 is made of inorganic insulating material and is very thin compared with organic insulating material, it exhibits a height difference due to a underlying metal layer or the like.

The diffraction mask 980 includes a first transmission region A1 and third transmission region A3 for partially transmitting incident light, a second transmission region A2 for completely transmitting the incident light, and a blocking region A3 for completely blocking the incident light.

As illustrated in FIG. 9A, a region D has a height difference where the gate electrode 930 is formed.

The present embodiment is characterized in that the width of the slits in a predetermined portion A4b of the third transmission region A4 is narrower than those in a predetermined portion of the fourth transmission region A4a and the first transmission region A1 so as to compensate for reflection from the gage electrode 930 which causes a reduction in the thickness of the photoresist film at the portion that overlies the gate electrode 930.

In other words, the width of the slits in the normal first transmission region A1 and both ends A4a of the fourth transmission region is preferably about 1.2 µm, but the width of the slits in the portion A4b of the fourth transmission region is preferably about 1.0 µm.

Thus, by reducing the width of the slits in the portion A4b of the third transmission region A4, the amount of the light used for exposure of the photoresist film is decreased, so that the photoresist film over the gate electrode 930 experiences less reflective thinning.

Although the positive photoresist film is exemplarily described in the present embodiment, a negative photoresist film can be also used.

The exposed transparent conductive layer 952 and the underlying second insulating layer 940 are sequentially etched by using the first and second photoresist patterns 972 and 974 as a mask, thereby forming a first contact hole 960 and a second contact hole 962.

As illustrated in FIG. 9B, the first photoresist pattern 972 formed through the first transmission region A1 is thinner than the second photoresist pattern 974 formed through the blocking region A3. Also, the diffraction exposure is performed by using the slit pattern, such that the third transmission region A4 has a difference in width so that the first photoresist pattern 972 can maintain a uniform thickness.

In other words, since the third transmission region A4 is provided with the portion A4b where the slit width is narrower and the portion A4a where the slit width is wider, the slit width of the diffraction mask in the region where the gate electrode is formed is reduced to decrease the amount of the light transmitted through the corresponding region of the diffraction mask. By compensating for the reflection of the light by the gate electrode 930 and the height of the gate electrode 930, the thickness h3 of the photoresist film remaining over the gate electrode 930 is nearly the same as the thickness h3 of the photoresist film in peripheral regions of the gate electrode 930.

Hence, as shown in FIG. 9C, when the first photoresist pattern 972 is removed using an ashing process, the more uniform thickness of the first photoresist pattern 972 can overcome the process failure mentioned with reference to FIG. 8C. Also, after the ashing process, a portion 975 of second photoresist pattern 974 remains on corresponding blocking region A3.

In the third mask process described above, the contact holes and the pixel electrode are formed by one mask process. However, in the present embodiment, the regions where the diffraction slits having the smaller slit width are applied are positioned to an entire region of the pixel region except for the regions where the contact holes and the pixel electrode are formed. For this purpose, the present invention utilizes the diffraction mask capable of performing diffraction in a large area, which will be described below in detail.

Figure 10:
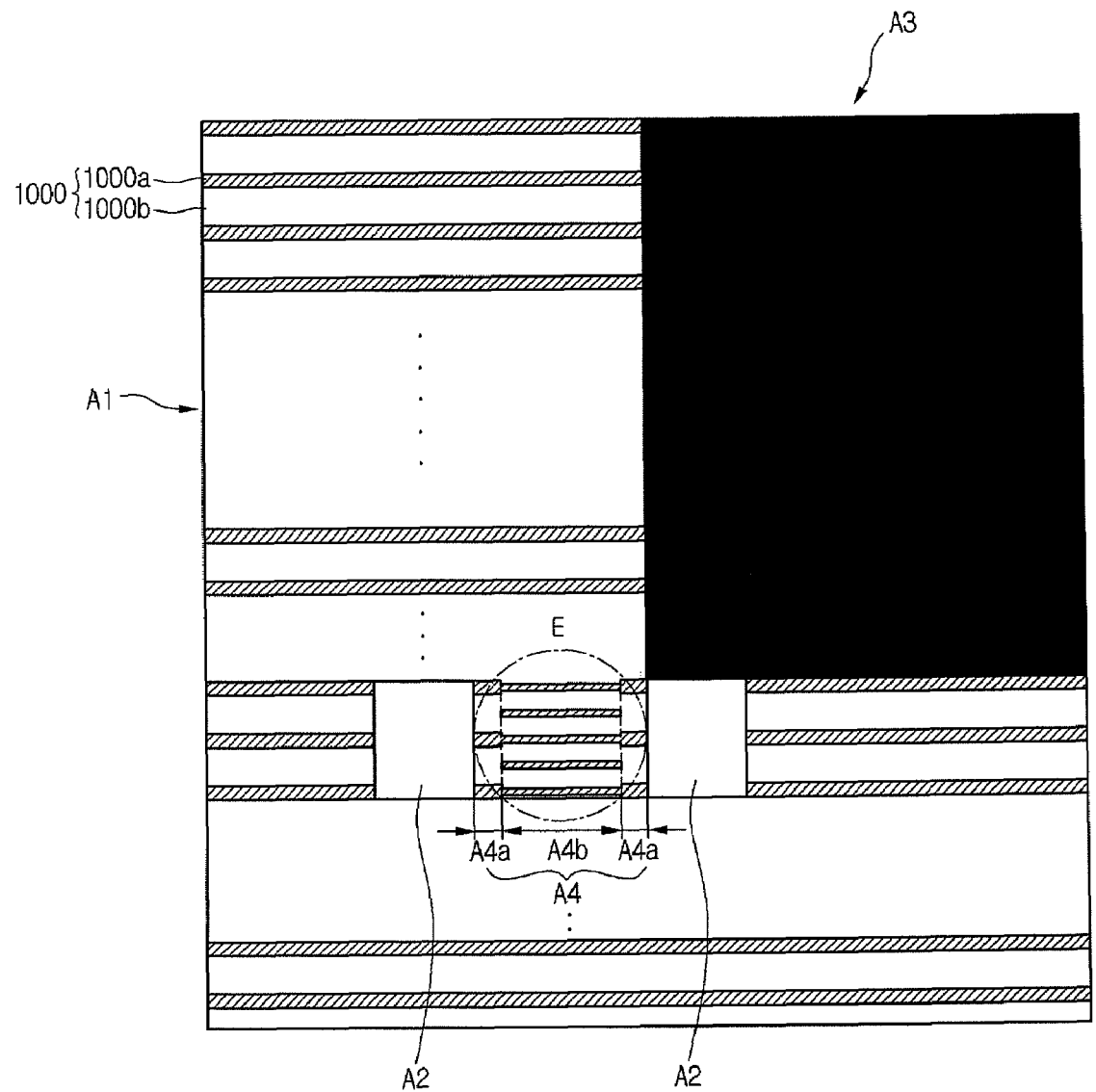
FIG. 10 is a partial plan view of a diffraction mask used in a fabrication method of an LCD array substrate according to a second embodiment of the present invention.

FIG. 10 is a partial plan view of a diffraction mask for a large-sized screen used in a fabrication method of an LCD array substrate. Specifically, the illustrated mask is used in the third mask process according to another embodiment of the present invention, and only a portion of the mask corresponding to a unit pixel region is shown in FIG. 10.

In particular, the diffraction mask of FIG. 10 is designed for use with a positive photoresist film but the present invention is not limited thereto.

Referring to FIGS. 9 and 10, the diffraction mask includes the second transmission region A2 for forming the contact holes, and the blocking region A3 for forming the pixel electrode. Also, the diffraction mask further includes the first transmission region A1 and the fourth transmission region A4 having a plurality of slits 1000 arranged continuously over a large area.

The diffraction mask of FIG. 10 is characterized in that the slits 1000 are not all arranged at a constant interval but are arranged at a smaller width at a region E where a metal layer, such as the gate electrode 930 is formed (the fourth transmission region A4).

Also, in FIG. 10, the slits 1000 are arranged in a row direction. Alternatively, the slits 1200 may be formed in a column direction or in the form of dots.

Referring to FIG. 10, the second transmission region A2 completely transmits the incident light such that contact holes 960 and 962 partially exposing source and drain regions are formed. The first transmission region A1 is formed in a diffraction pattern to partially transmit the incident light, such that the pixel electrode 950 is formed only at the blocking region A3.

As shown in FIG. 10, the diffraction pattern having the first transmission region A1 and the fourth transmission region A4 includes bars 1000a for partially blocking light and spaces 1000b for transmitting light. The spaces 1000b preferably have a width ranging from about 1.0 µm to about 2.0 µm and can vary depending on the exposure apparatus and process recipe.

As described above, the interval between the spaces 1000b, i.e., the width of the slit in the fourth transmission region A4, may be different than the interval between the spaces in other regions other than the fourth transmission region A3.

In other words, at the region A4b where the metal layer is formed, the width of the slit is made narrow, and at the region A4a where the metal layer is not formed, the width of the slit is comparatively wider.

As one example, the width of the slit in the region where the metal layer is formed is preferably designed to be about 1.0 µm, and the width of the slit in the first portion A1 of the first transmission region A1 is preferably designed to be about 1.2 µm.

Although the exemplarily embodiment of FIG. 9 shows and describes that the metal layer is the gate electrode, the present invention is not necessarily limited to the metal layer. That is, it will be understood to those skilled in the art that the present invention can be applied to a layer positioned below the photoresist film is not a metal, but causes a difference in the thickness of the photoresist film due to a height difference of the layer.

Also, the present invention can be applied to an LCD array substrate having a dual gate structure. In the fabrication method of the LCD array substrate having the dual gate structure, the diffraction mask is designed to have a region including slits having a narrow width so as to correspond to the region where a metal layer, such as the gate electrode, is formed.

Figure 11:
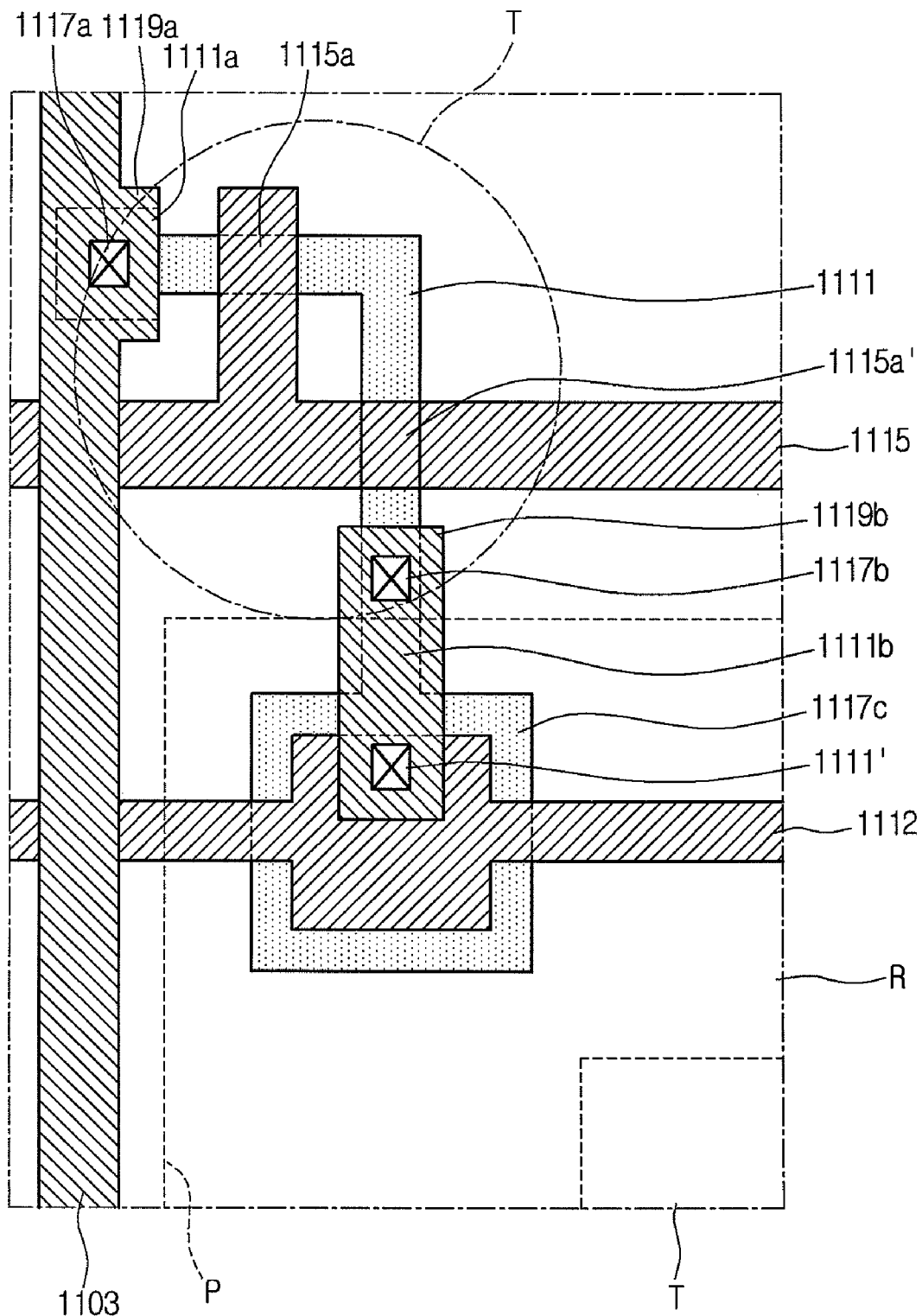
FIG. 11 is a magnified plan view of pixels of an LCD array substrate employing a dual gate structure.

FIG. 11 is a magnified plan view of pixels of an LCD array substrate employing a dual gate structure. Referring to FIG. 11, a gate line 1115 and a data line 1103 are arranged to perpendicularly cross each other, and a thin film transistor (TFT) having a dual gate is formed at a crossing region of the gate line 1115 and the data line 1103.

The TFT includes an active layer 1111, gate electrodes 1115a and 1115a', and source and drain electrodes 1119a and 1119b.

A part of the active layer 1111 forms a lower electrode 1111' of a storage capacitor, and the lower electrode 1111' forms the storage capacitor Cst together with an upper electrode 1112 formed on the lower electrode 1111'.

The gate electrode includes the first gate electrode 1115a branching from the gate line 1115, and the second gate electrode 1115a' corresponding to a part of the gate line 1115 overlapping the active layer 1111.

The source electrode 1119a branches from the data line 1103 and is electrically connected with a source region 1111a through a first contact hole 1117a. The drain electrode 1119b has one end connected with the drain region 1111b through a second contact hole 1117b, and the other end connected with a pixel electrode, i.e., with a transmission electrode formed on a transmission region T and a reflection electrode formed on a reflection region R at the same time.

In the above array substrate, when a gate signal having a high voltage level is applied to the gate electrode, a channel serving as an electron transfer path is formed in the active layer and thus data signals of the source electrode are transferred to the drain electrode via the active layer.

The storage capacitor charges a gate voltage while a gate signal is applied to the gate electrode, and then discharges the voltage to prevent a voltage variation in the pixel electrode while a next gate line is driven and a data voltage is supplied to the pixel electrode.

Correspondingly, when a gate signal having a low voltage level is applied to the gate electrode, the channel formed in the active layer is shut off and a signal transmission to the drain electrode is stopped. The use of the dual gate electrodes in the LCD can decrease leakage current generated when a gate signal is shut off.

The dual gate electrodes can be applied to a transmission type LCD in which only a transmission electrode is formed on a pixel region, or a reflection type LCD in which only a reflection electrode is formed on a pixel region.

The present embodiment is characterized as described in FIGS. 4 through 10 in that in forming an LCD array substrate having dual gate electrodes, contact holes 117a and 117b and pixel electrode are concurrently formed using one mask.

Also, the present embodiment is characterized in that in performing the diffraction exposure, the width of the diffraction slit at a region where a metal layer such as the gate electrode is formed is made narrower than that at a region where the metal layer is not formed, thereby uniformly controlling the thickness of the photoresist film.

Figure 12:
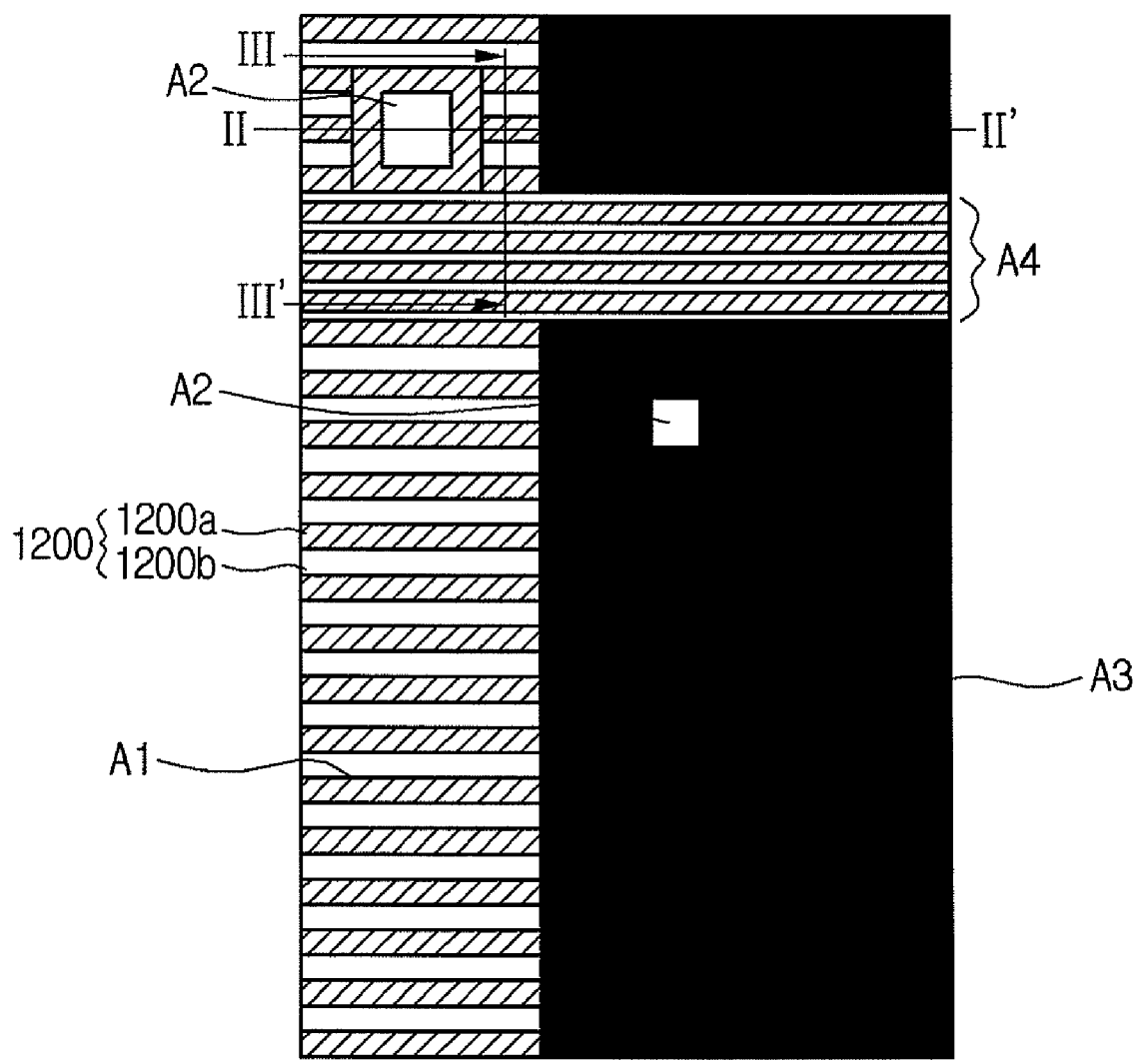
FIG. 12 is a partial plan view of a diffraction mask used in a fabrication of the LCD array substrate of FIG. 11.

FIG. 12 is a partial plan view of a diffraction mask used in a fabrication of the LCD array substrate of FIG. 11, and shows the large-sized diffraction mask used in the third mask process. In particular, FIG. 12 shows a region of the diffraction mask corresponding to a unit pixel region. Although FIG. 12 shows and describes the diffraction mask designed to be applied to the positive photoresist film, its application is not limited only to the positive photoresist film.

Referring to FIGS. 11 and 12, the diffraction mask includes the second transmission region A2 for forming the contact hole, and the blocking region A3 for forming the pixel electrode, and the like. Also, the diffraction mask further includes the first transmission region A1 and the third transmission region A4 having a plurality of slits 1200 arranged continuously and having a large area.

The diffraction mask of FIG. 12 is characterized in that the slits 1200 are not all arranged at a constant interval, but the slits 1200 formed at the third transmission region A4 are arranged at a smaller width corresponding to a region where a metal layer, such as the gate electrode or the gate line, is formed. Also, in FIG. 12, the slits 1200 are arranged in a row direction. Alternatively, the slits 1200 may be formed in a column direction or in the form of dots.

The second transmission region A2 completely transmits the incident light such that contact holes partially exposing source and drain regions are formed. The first transmission region A1 and the third transmission region A4 are formed in a diffraction pattern to partially transmit the incident light, such that the pixel electrode is formed only at the blocking region A3.

The diffraction pattern having the first transmission region A1 and the third transmission region A4 includes bars 1200a for partially blocking light and spaces 1200b for transmitting light. The spaces 1200b preferably have a width ranging from about 1.0 μm to about 2.0 μm and can vary depending on the exposure apparatus and recipe.

As described above, in the third transmission region A4, the interval between the spaces 1200b, i.e., the width of the slit, is not constant. In other words, at the region where the metal layer is formed, the width of the slit is made narrow, and at the region where the metal layer is not formed, the width of the slit is made wide comparatively.

As one example, the width of the slit in the region where the metal layer is formed is preferably about 1.0 μm, and the width of the slit in the first portion A1 of the first transmission region A1 is preferably designed to be about 1.2 μm.

Figure 13A:
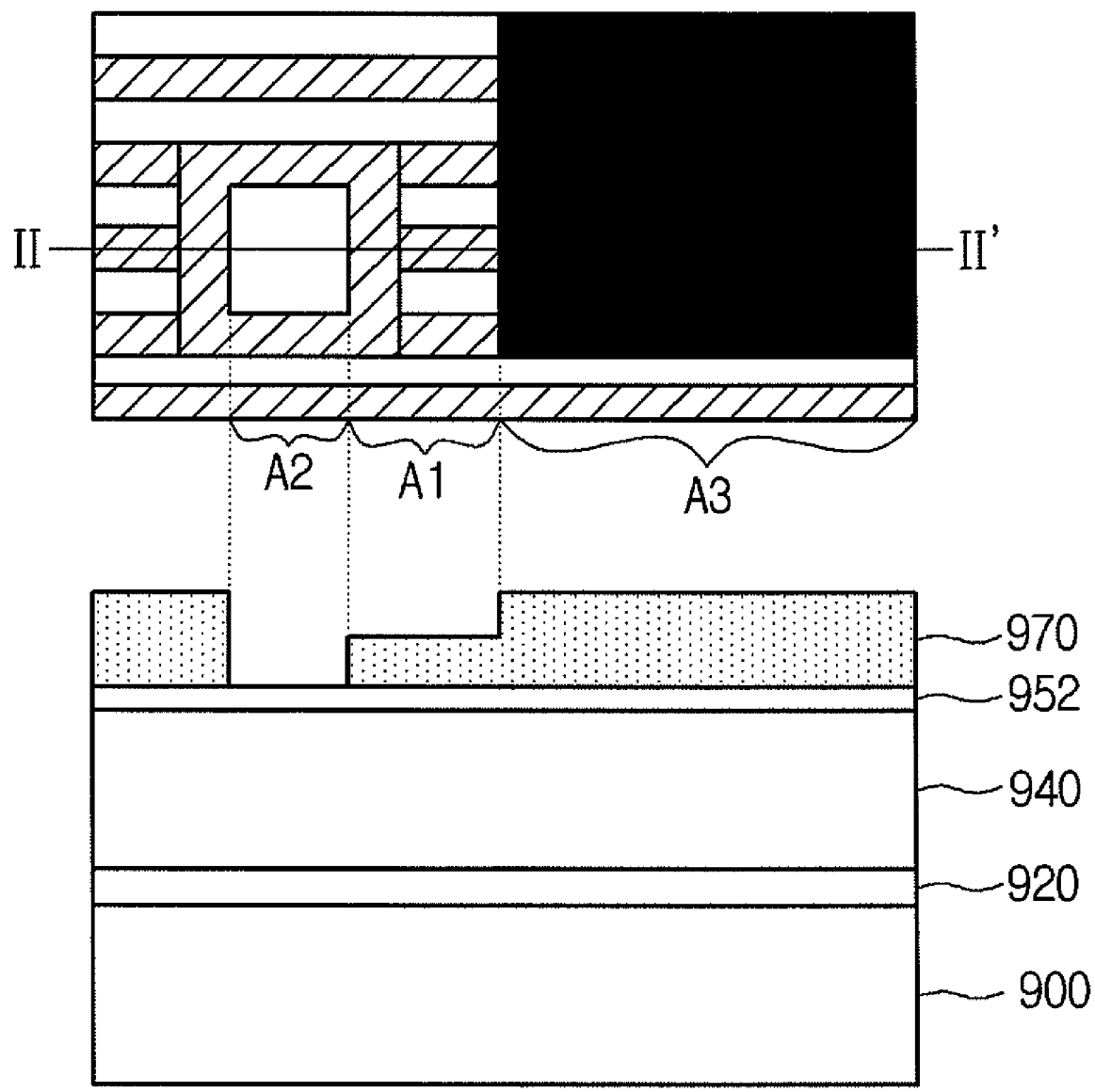
FIGS. 13A and 13B are sectional views of a selected portion of FIG. 12.
Figure 13B:
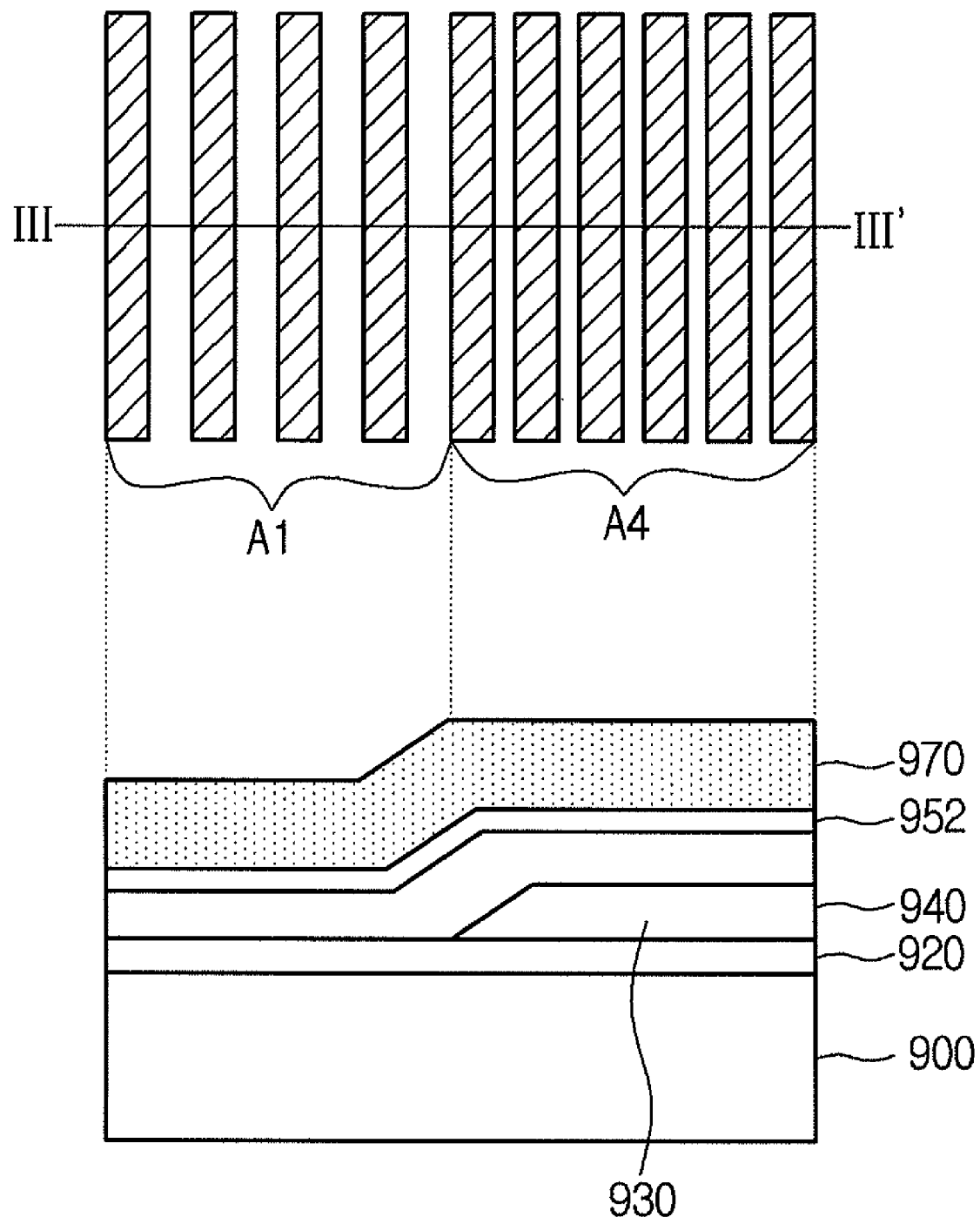

FIGS. 13A and 13B are sectional views of a selected portions of FIG. 12. FIG. 13A shows a sectional view taken along section line II-II' of FIG. 12 and FIG. 13B shows a sectional view taken along section line III-III' of FIG. 12.

Referring to FIG. 13A, light completely transmits through a second transmission region A2 to expose the photoresist film so that the exposed photoresist film is completely removed by the developing process. Since the light is diffracted while passing through a first transmission region A1, the photoresist film corresponding to the first transmission region A1 is only partially removed by the developing process. Also, since a blocking region A3 of the diffraction mask blocks the light, the photoresist film corresponding to the blocking region A3 is not exposed and consequently is not removed by the developing process.

In the present embodiment, slits formed at the first transmission region A1 are not all formed at a constant interval as shown in FIG. 13B. In other words, the diffraction mask shown in FIG. 13B is characterized in that the slits are arranged at a smaller width at a region F where a metal layer such as the gate electrode or the gate line is formed, thereby uniformly controlling the thickness of the photoresist film.

If all the slits of the first transmission region are formed at an equal interval, the light used for exposure of the photoresist film is reflected by a metal layer, such as the gate electrode, and a thickness h1 of the photoresist film remaining on the gate electrode is different than a thickness h2 of the photoresist film at a periphery, as described above with reference to FIGS. 7A through 7C.

To solve the above problems, the width of the slits at the region A4 where the metal layer is formed is made narrower as shown in FIG. 13B. As described above, according to an array substrate of an LCD and fabrication method thereof, a contact hole exposing a drain region of a TFT and a pixel electrode are formed by one mask process, thereby simplifying the fabrication process and enhancing the productivity. Also, a large-sized diffraction mask having slits of which widths are controlled depending on whether there exists a metal layer below a diffraction-exposed portion is provided, thereby controlling the thickness of the photoresist film during the diffraction exposure.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. A method of fabricating an array substrate of an LCD, the method comprising:
   sequentially forming an active layer, a first insulating layer, and a gate electrode on a substrate;
   forming a source region and a drain region on predetermined regions of the active layer by implanting impurity ions into the predetermined regions of the active layer;
   forming a second insulating layer on an entire surface of the substrate including the gate electrode;
   forming a pixel electrode on the second insulating layer, and forming first and second contact holes by removing portions of the first and second insulating layer overlying the source region and the drain region;
   forming a source electrode of which a portion contacts the source region through the first contact hole;
   forming a drain electrode of which a first portion contacts the drain region and a second portion contacts the pixel electrode, and,
   forming a third insulating layer formed on the source electrode, the drain electrode and the pixel electrode.

2. The method of claim 1, wherein the forming the pixel electrode and the first and second contact holes comprises:
   forming a transparent conductive film on the second insulating layer;
   coating a photoresist film on the transparent conductive film;
   irradiating a light onto the coated photoresist film using a mask having a first transmission region partially transmitting the light, a second transmission region completely transmitting the light, and a blocking region that substantially blocks the light;
   developing the photoresist film exposed to the light to form a first photoresist pattern corresponding to the first transmission region and a second photoresist pattern corresponding to the shielding region;
   partially removing the first insulating layer, the second insulating layer, and the transparent conductive film using the first and second photoresist patterns as a mask to form the first and second contact holes;
   removing the first photoresist pattern; and
   patterning the transparent conductive film using the second photoresist pattern as a mask to form the pixel electrode.

3. The method of claim 2, wherein the first transmission region has a diffraction pattern for partially transmitting the light that is incident into regions other than the regions where the first and second contact holes are being formed.

4. The method of claim 2, wherein the first transmission region has a halftone pattern for partially transmitting the light that is incident into a region other than regions where the first and second contact holes are being formed.

5. The method of claim 3, wherein the diffraction pattern comprises a slit-shaped bar for partially shielding the light and a space for transmitting the light.

6. The method of claim 3, wherein the diffraction pattern has a slit width ranging from about 1.0 μm to about 2.0 μm.

7. The method of claim 2, wherein the slit widths of the diffraction pattern have a difference such that the photoresist pattern has a substantially uniform thickness.

8. The method of claim 7, wherein the slit widths of the diffraction pattern differ where a metal layer exists on a region of the substrate corresponding to the diffraction pattern.

9. The method of claim 8, wherein the diffraction pattern over the metal layer has the slit width of about 1.0 μm and the diffraction pattern over a region not having the metal layer has the slit width of about 1.2 μm.

10. The method of claim 1, further comprising:
    forming a third insulating layer overlying an entire surface of the substrate including the source electrode and the drain electrode;
    removing a predetermined portion of the third insulating layer to form a third contact hole exposing a predetermined region of the third insulating layer, and exposing the pixel electrode; and
    forming a reflection electrode electrically connected with the drain electrode through the third contact hole on the third insulating layer.

11. The method of claim 1, wherein the gate electrode comprises a first gate electrode branching from a gate line, and a second gate electrode, which comprises a portion of the gate line overlapping the active layer.

12. A method of fabricating an array substrate of an LCD, the method comprising:
    forming an active layer on a substrate using a first mask process;
    depositing a first insulating layer and a first metal layer on the substrate including the active layer and patterning the first metal layer using a second mask process to form a gate electrode;
    forming a source region and a drain region on predetermined regions of the active layer by implanting impurity ions into the predetermined regions of the active layer;
    depositing a second insulating layer and a transparent conductive film on an entire surface of the substrate including the gate electrode, and removing portions of the first and second insulating layers and the transparent conductive film using a third mask process to form first and second contact holes partially exposing the source and drain electrodes, and a pixel electrode;
    depositing a second metal layer on the substrate and patterning the second metal layer using a fourth mask process to form a source electrode and a drain electrode, such that the source electrode is connected to the source region through the first contact hole and the drain electrode is connected to the drain electrode through the second contact hole and,
    forming a third insulating layer formed on the source electrode, the drain electrode and the pixel electrode.

13. The method of claim 12, wherein the pixel electrode and the first and second contact holes are formed using a mask comprising a diffraction pattern.

14. The method of claim 13, wherein the diffraction pattern partially transmits incident light through regions other than the regions where the pixel electrode and the first and second contact holes are being formed.

15. The method of claim 14, wherein slit widths of the diffraction pattern differ when a metal layer exists on a region of the substrate corresponding to the diffraction pattern.

16. The method of claim 12, wherein the gate electrode comprises a first gate electrode branching from a gate line, and a second gate electrode, which comprises a portion of the gate line overlapping the active layer.

* * * * *